(12) United States Patent
Hirota

(10) Patent No.: US 11,579,580 B2
(45) Date of Patent: Feb. 14, 2023

(54) CONTROL SYSTEM, CONTROL METHOD, AND NON-TRANSITORY COMPUTER READABLE MEDIUM

(71) Applicant: OMRON Corporation, Kyoto (JP)

(72) Inventor: Takuya Hirota, Takatsuki (JP)

(73) Assignee: OMRON Corporation, Kyoto (JP)

( * ) Notice: Subject to any disclaimer, the term of this patent is extended or adjusted under 35 U.S.C. 154(b) by 208 days.

(21) Appl. No.: 17/278,337

(22) PCT Filed: Oct. 2, 2019

(86) PCT No.: PCT/JP2019/038955
§ 371 (c)(1),
(2) Date: Mar. 22, 2021

(87) PCT Pub. No.: WO2020/071436
PCT Pub. Date: Apr. 9, 2020

(65) Prior Publication Data
US 2021/0349434 A1 Nov. 11, 2021

(30) Foreign Application Priority Data
Oct. 5, 2018 (JP) .............................. JP2018-190150

(51) Int. Cl.
*G05B 19/04* (2006.01)
*G05B 19/042* (2006.01)
(52) U.S. Cl.
CPC ............ *G05B 19/0426* (2013.01); *G05B 2219/25032* (2013.01)
(58) Field of Classification Search
CPC ...... G05B 19/0426; G05B 2219/25032; G05B 19/0421; G06F 8/30; G06F 8/36
See application file for complete search history.

(56) References Cited

U.S. PATENT DOCUMENTS 11,520,922 B2 * 12/2022 Marlin ...................... H04L 9/50
2008/0072013 A1 * 3/2008 Yamamoto .............. G06F 9/321
712/42

(Continued)

FOREIGN PATENT DOCUMENTS

CA 2874184 C * 1/2021 ........... G06F 9/3004
CN 113614696 A * 11/2021 ............. G06F 9/445

(Continued)

OTHER PUBLICATIONS

Nie, Weiran, Kwei-Jay Lin, and Soo Dong Kim. "Capacity-based admission control for mixed periodic and aperiodic real time service processes." 2011 IEEE International Conference on Service-Oriented Computing and Applications (SOCA). IEEE, 2011. (Year: 2011).*

(Continued)

*Primary Examiner* — Michael D Masinick
(74) *Attorney, Agent, or Firm* — JCIPRNET

(57) ABSTRACT

The present invention provides a technology for invoking a non-periodic-execution function module from a periodic-execution control program. A control system that comprises first and second control parts (C1, C2) and a storage device that stores control programs (210, 211) for a controller. The control programs (210, 211) include a periodic-execution function module (55B) that invokes a non-periodic-execution function module (55A). The first control part (C1) reflects the value of an input variable for the periodic-execution function module (55B) in an argument for the non-periodic-execution function module (55A) and outputs an execution start command for the function modules to the second control part (C2). The second control part (C2) outputs a return value for the non-periodic-execution function module (55A) to the first control part (C1). The first (Continued)

control part (C1) reflects the return value in an output variable for the periodic-execution function module (55B).

8 Claims, 19 Drawing Sheets

(56) References Cited

U.S. PATENT DOCUMENTS

| | | | | |
|---|---|---|---|---|
| 2016/0085552 A1* | 3/2016 | Long | ............ | G06F 9/4881 |
| | | | | 712/229 |
| 2016/0085553 A1* | 3/2016 | Long | ............ | G06F 9/46 |
| | | | | 712/229 |
| 2018/0268145 A1* | 9/2018 | Teshome | ............ | G06F 21/572 |
| 2019/0103989 A1* | 4/2019 | Kida | ............ | B25J 9/1682 |

FOREIGN PATENT DOCUMENTS

| | | |
|---|---|---|
| JP | 2002189507 | 7/2002 |
| JP | 2016110220 | 6/2016 |
| JP | 2016224557 | 12/2016 |
| WO | WO-2020071435 A1 * 4/2020 | ......... G05B 19/0426 |

OTHER PUBLICATIONS

Isovic, Damir, and Gerhard Fohler. "Efficient scheduling of sporadic, aperiodic, and periodic tasks with complex constraints." Proceedings 21st IEEE Real-Time Systems Symposium. IEEE, 2000. (Year: 2000).*

Soetens, Peter, and Herman Bruyninckx. "Realtime hybrid task-based control for robots and machine tools." Proceedings of the 2005 IEEE International Conference on Robotics and Automation. IEEE, 2005. (Year: 2005).*

"International Search Report (Form PCT/ISA/210)"of PCT/JP2019/038955, dated Dec. 10, 2019, with English translation thereof, pp. 1-3.

"Written Opinion of the International Searching Authority (Form PCT/ISA/237)" of PCT/JP2019/038955, dated Dec. 10, 2019, with English translation thereof, pp. 1-8.

* cited by examiner

CONTROL SYSTEM, CONTROL METHOD, AND NON-TRANSITORY COMPUTER READABLE MEDIUM

CROSS-REFERENCE TO RELATED APPLICATION

This application is a 371 application of the International PCT application serial no. PCT/JP2019/038955, filed on Oct. 2, 2019, which claims the priority benefits of Japan Patent Application No. 2018-190150, filed on Oct. 5, 2018. The entirety of each of the above-mentioned patent applications is hereby incorporated by reference herein and made a part of this specification.

TECHNICAL FIELD

The present disclosure relates a technique for executing programs defined by different types of programming languages.

BACKGROUND ART

A controller such as a programmable logic controller (PLC) has been introduced in various manufacturing sites. The controller is a kind of computer, and executes a control program that is designed in accordance with a manufacturing device or a manufacturing facility. The control program is created by using a support device that is provided separately from the controller.

For example, Japanese Laid-Open No. 2016-224557 (Patent Literature 1) discloses a technique for reducing a burden on a user who creates a program written in a graphical programming language and a program written in an advanced programming language.

CITATION LIST

Patent Literature

Patent Literature 1

Japanese Laid-Open No. 2016-224557

SUMMARY OF INVENTION

Technical Problem

A control program for a controller is written in a periodic-execution programming language. Periodic execution refers to an execution type in which a first line to a last line of a control program is repeatedly executed every predefined cycle. In other words, in the periodic-execution control program, an execution cycle of the program is secured.

There is a desire to invoke a function module written in a non-periodic-execution programming language from such a periodic-execution control program. Non-periodic execution refers to an execution type in which respective lines of a program are sequentially executed. A time from starting of execution to end thereof is not secured in a non-periodic-execution function module.

The present disclosure has been made to solve the above problem, and an objective in a certain aspect is to provide a control system capable of invoking a non-periodic-execution function module from a periodic-execution control program. An objective in another aspect is to provide a control method capable of invoking a non-periodic-execution function module from a periodic-execution control program. An objective in still another aspect is to provide a control program capable of invoking a non-periodic-execution function module from a periodic-execution control program.

Solution to Problem

In an example of the present disclosure, there is provided a control system including a storage device that stores a control program for a controller. The control program includes a periodic-execution function module for invoking a non-periodic-execution function module. The control system further includes a first control part that executes the control program; and a second control part that executes the non-periodic-execution function module. In a case where the periodic-execution function module is executed during execution of the control program, the first control part reflects a value of an input variable for the periodic-execution function module in an argument for the non-periodic-execution function module and outputs an execution start command for the non-periodic-execution function module to the second control part. The second control part starts execution of the non-periodic-execution function module on the basis of reception of the execution start command, and outputs a return value for the non-periodic-execution function module to the first control part on the basis of completion of the execution of the non-periodic-execution function module. The first control part reflects the return value in an output variable for the periodic-execution function module on the basis of reception of the return value from the second control part.

According to this disclosure, the input variable for the periodic-execution function module that is an invocation source is reflected in the argument for the non-periodic-execution function module that is an invocation destination. The return value for the non-periodic-execution function module that is an invocation destination is reflected in the output variable for the periodic-execution function module that is an invocation source. Consequently, the control system can invoke the non-periodic-execution function module from the periodic-execution function module.

In the example of the present disclosure, the first control part stops the execution of the control program from outputting of the execution start command to the second control part until the reception of the return value.

According to this disclosure, the first control part can execute the non-periodic-execution function module in synchronization with an execution cycle of the periodic-execution control program.

In the example of the present disclosure, the first control part continuously executes the control program from outputting of the execution start command to the second control part until reception of the return value.

According to this disclosure, consequently, the first control part can execute the non-periodic-execution function module out of synchronization with an execution cycle of the periodic-execution control program.

In the example of the present disclosure, an output of the periodic-execution function module includes an output variable for reflecting the completion of the execution of the non-periodic-execution function module.

According to this disclosure, an execution result of the periodic-execution function module is reflected in the output variable for the non-periodic-execution function module that is an invocation source.

In the example of the present disclosure, the first control part converts the value of the input variable in accordance with a data type of the argument, and then reflects the value of the input variable in the argument.

According to this disclosure, a difference between the data type of the input variable for the periodic-execution function module and the data type of the argument for the non-periodic-execution function module is absorbed.

In the example of the present disclosure, the first control part converts the return value in accordance with a data type of the output variable, and then reflects the return value in the output variable.

According to this disclosure, a difference between the data type of the return value for the non-periodic-execution function module and the data type of the output variable for the periodic-execution function module is absorbed.

In another example of the present disclosure, there is provided a control method for a control system including a first control part and a second control part. The control method includes a step of acquiring a control program for a controller. The control program includes a periodic-execution function module for invoking a non-periodic-execution function module. The control method further includes a step of causing the first control part to execute the control program; a step of, in a case where the periodic-execution function module is executed during execution of the control program, causing the first control part to reflect a value of an input variable for the periodic-execution function module in an argument for the non-periodic-execution function module and to output an execution start command for the non-periodic-execution function module to the second control part; a step of causing the second control part to start execution of the non-periodic-execution function module on the basis of reception of the execution start command, and to output a return value for the non-periodic-execution function module to the first control part on the basis of completion of the execution of the non-periodic-execution function module; and a step of causing the first control part to reflect the return value in an output variable for the periodic-execution function module on the basis of reception of the return value from the second control part.

According to this disclosure, the input variable for the periodic-execution function module that is an invocation source is reflected in the argument for the non-periodic-execution function module that is an invocation destination. The return value for the non-periodic-execution function module that is an invocation destination is reflected in the output variable for the periodic-execution function module that is an invocation source. Consequently, control method makes it possible to invoke the non-periodic-execution function module from the periodic-execution function module.

In still another example of the present disclosure, there is provided a periodic-execution control program executed by a controller. The control program includes a periodic-execution function module for invoking a non-periodic-execution function module. The controller includes a first control part. An external apparatus configured to be able to communicate with the controller or the controller includes a second control part. The control program causing the first control part to execute a step of executing the control program; a step of, in a case where the periodic-execution function module is executed during execution of the control program, reflecting a value of an input variable for the function module in an argument for the non-periodic-execution function module and outputting an execution start command for the non-periodic-execution function module to the second control part; and a step of, on the basis of reception of an execution result of the non-periodic-execution function module from the second control part, reflecting the execution result in an output variable for the periodic-execution function module.

According to this disclosure, the input variable for the periodic-execution function module that is an invocation source is reflected in the argument for the non-periodic-execution function module that is an invocation destination. The return value for the non-periodic-execution function module that is an invocation destination is reflected in the output variable for the periodic-execution function module that is an invocation source. Consequently, the control program makes it possible to invoke the non-periodic-execution function module from the periodic-execution function module.

Advantageous Effects of Invention

In a certain aspect, it is possible to invoke a non-periodic-execution function module from a periodic-execution control program.

DESCRIPTION OF EMBODIMENTS

Figure 1:
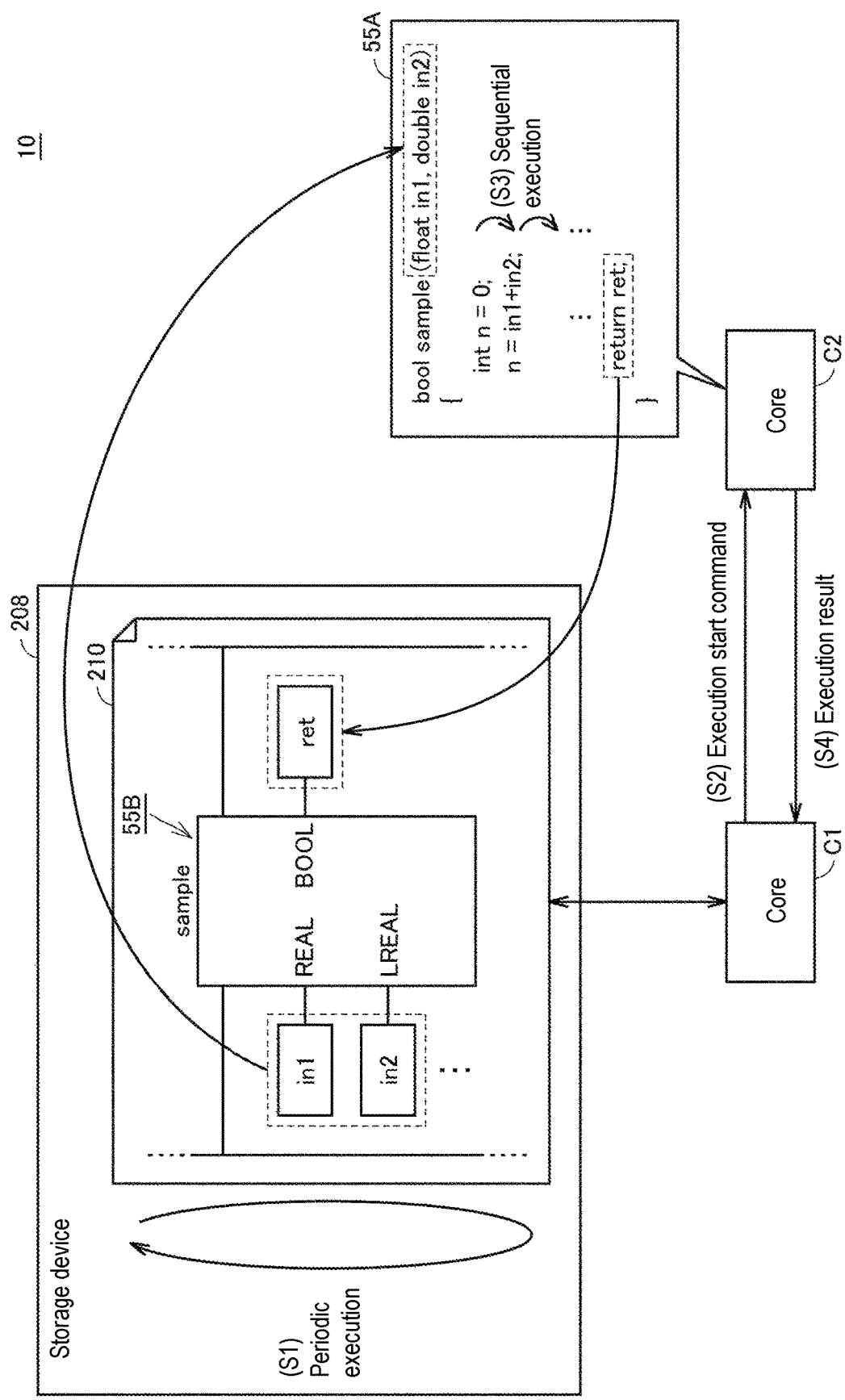
FIG. 1 is a diagram illustrating a device configuration of a control system.

Hereinafter, with reference to the drawings, each embodiment of the present invention will be described. In the following description, the same components and constituents are given the same reference numerals. The same applies to names and functions thereof. Therefore, a detailed description thereof will not be repeated.

A. Application Example 1

First, with reference to FIG. 1, an application example of the present invention will be described. FIG. 1 is a diagram illustrating a device configuration of a control system 10 according to an embodiment.

The control system 10 includes a core C1 (first control part) for executing a periodic-execution program, a core C2 (second control part) for executing a non-periodic-execution program, and a storage device 208.

The core C1 and the core C2 operate on different types of operating systems (OSs). Typically, the core C1 operates on a first type of OS such as a real time OS, and uses a fundamental function of the OS. On the other hand, the core C2 operates on a second type of OS such as Linux (registered trademark) or Windows (registered trademark), and uses a fundamental function of the OS.

In the present specification, a system configured with two or more cores C1 and C2 (first and second control parts) will be referred to as a "control system". In other words, the concept "control system" includes a system configured with a single device including at least two cores C1 and C2, or with a first device including the core C1 and a second device including the core C2.

The storage device 208 is a nonvolatile memory, and stores a user program 210 that is a kind of control program for a controller. The user program 210 is written in a periodic-execution programming language. The periodic execution refers to an execution type in which a first line to a last line of a control program is repeatedly executed every predefined cycle. In other words, in the periodic-execution control program, an execution cycle of the program is secured. The periodic-execution programming language includes, for example, a ladder language and a structured text (ST) language.

A development support device 100 according to the present embodiment can invoke a non-periodic-execution function module 55A defined in a non-periodic-execution programming language from the periodic-execution user program 210. The non-periodic execution refers to an execution type in which respective lines of a program are sequentially executed. A time from starting of execution to end thereof is not secured in a non-periodic-execution function module. The non-periodic-execution programming language includes, for example, a C language, C++, Java (registered trademark), and Python.

In step S1, the core C1 repeatedly executes the user program 210 every predefined control cycle. The user program 210 includes a periodic-execution function module 55B for invoking the function module 55A. The function module 55B is a wrapper module of the function module 55A.

In step S2, in a case where the periodic-execution function module 55B is executed during execution of the user program 210, the core C1 outputs an execution start command for the non-periodic-execution function module 55A to the core C2. In this case, input variables "in1" and "in2" for the function module 55B are reflected in arguments "in1" and "in2" for the function module 55A.

In step S3, the core C2 starts to execute the function module 55A on the basis of reception of the execution start command for the function module 55A from the core C1. In this case, the core C2 sequentially executes respective lines of the function module 55A.

In step S4, the core C2 outputs an execution result of the function module 55A to the core C1 on the basis of completion of execution of the function module 55A. In this case, the core C1 reflects a return value "ret" for the function module 55A in an output variable "ret" for the function module 55B.

The "variable" is an identifier assigned to data handled in a control program for a controller. Typically, the "variable" is data indicating a state of a controller or a control target of the controller. In other words, the "variable" refers to data of which a value changes in correspondence with a state of the controller or the control target of the controller. The concept of the "variable" may include data indicating a single value, data represented as an array, data represented as a structure, and various pieces of data definable in a control program.

As described above, the control system 10 includes the core C1 that executes the periodic-execution user program 210 and the core C2 that executes the non-periodic-execution function module 55A on consignment from the core C1. Since programs having different from execution forms are executed by different cores, it is possible to invoke a non-periodic-execution function module from a periodic-execution control program.

B. System Configuration of FA System 1

Figure 2:
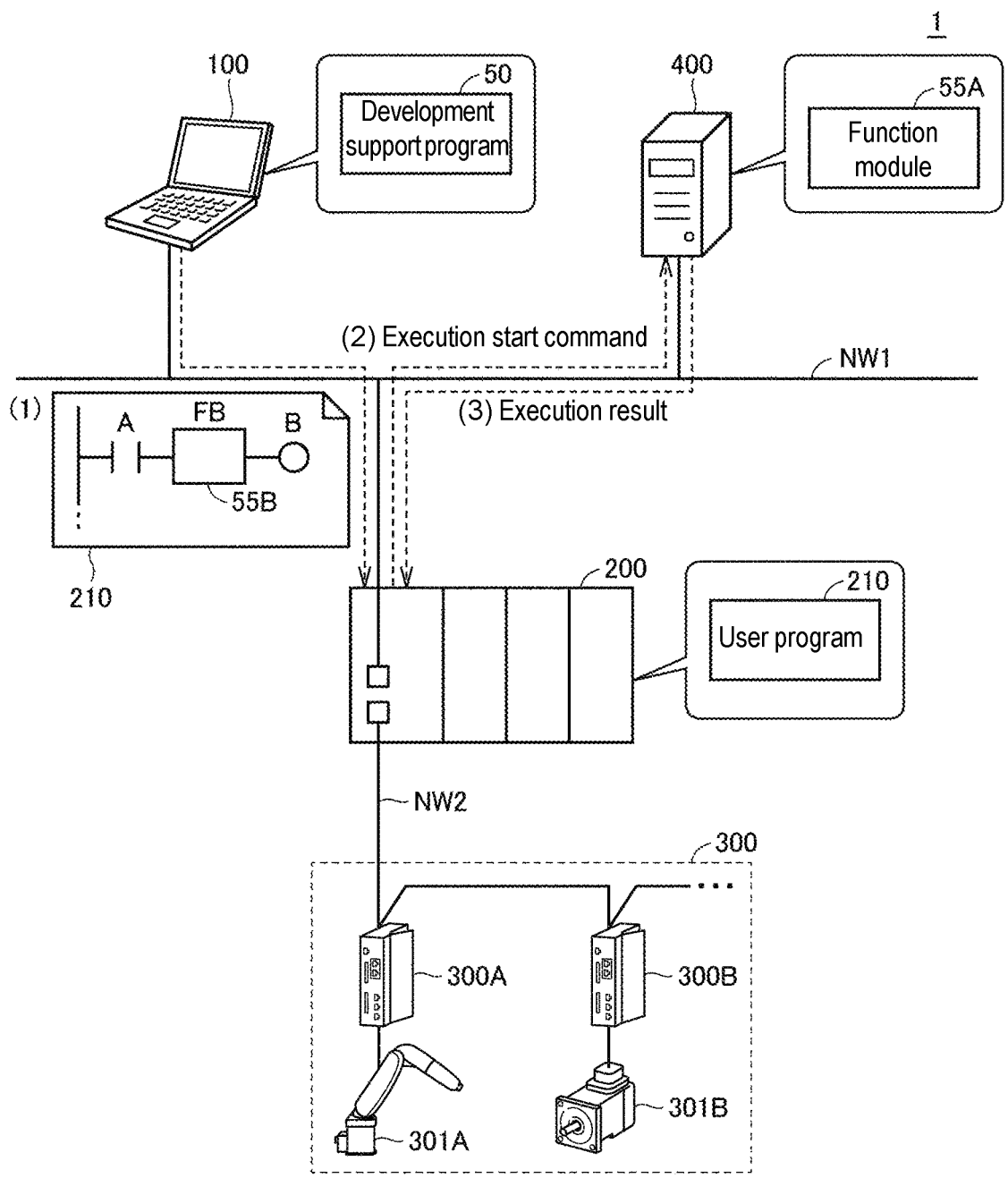
FIG. 2 is a diagram illustrating an example of a system configuration of a factory automation system (FA) system.

FIG. 2 is a diagram illustrating an example of a system configuration of an FA system 1. With reference to FIG. 2, a system configuration of the FA system 1 will be described.

The FA system 1 is a system used to automate a production process. The FA system 1 includes one or more development support devices 100, one or more controllers 200, one or more drive apparatuses 300, and one or more external apparatuses 400.

The development support device 100, the controller 200, and the external apparatus 400 are connected to a network NW1. The network NW1 employs EtherNET (registered trademark) or the like.

The controller 200 and the drive apparatus 300 are connected to a network NW2. The network NW2 preferably employs a field network that ensures a data arrival time and performs fixed period communication. As such a field network performing the fixed period communication, there are EtherCAT (registered trademark), EtherNet/IP (registered trademark), CompoNet (registered trademark), and the like.

The drive apparatuses 300 include various industrial apparatuses used to automate a production process. As an example, the drive apparatuses 300 include a robot controller 300A, a servo driver 300B, an arm robot 301A controlled by the robot controller 300A, and a servo motor 301B controlled by the servo driver 300B. The drive apparatuses 300 may include a visual sensor used to image a workpiece, other apparatuses used in a production process, and the like.

A designer may start a development tool for a user program 210 by executing the development support program 50. The designer may design the user program 210 on the started development tool. In this case, the designer may incorporate the function module 55B as a wrapper module into the user program 210. The designed user program 210 is compiled and is then transmitted to the controller 200.

The controller 200 starts to execute the user program 210 on the basis of reception of an execution start command for the user program 210, and controls the drive apparatus 300 according to a control command defined in the user program 210. In a case where the function module 55B as a wrapper module is executed during execution of the user program 210, the controller 200 transmits an execution start command for the corresponding function module 55A to the external apparatus 400. The external apparatus 400 starts to execute the function module 55A on the basis of reception of the execution start command. Thereafter, the external apparatus 400 transmits an execution result of the function module 55A to the controller 200.

In the above description, a description has been made of the example in which execution of the function module 55A is consigned to the external apparatus 400, but the execution of the function module 55A is not necessarily required to be consigned to the external apparatus 400. A pattern of not consigning the execution of the function module 55A to the external apparatus 400 will be described later.

C. Hardware Configuration

Figure 3:
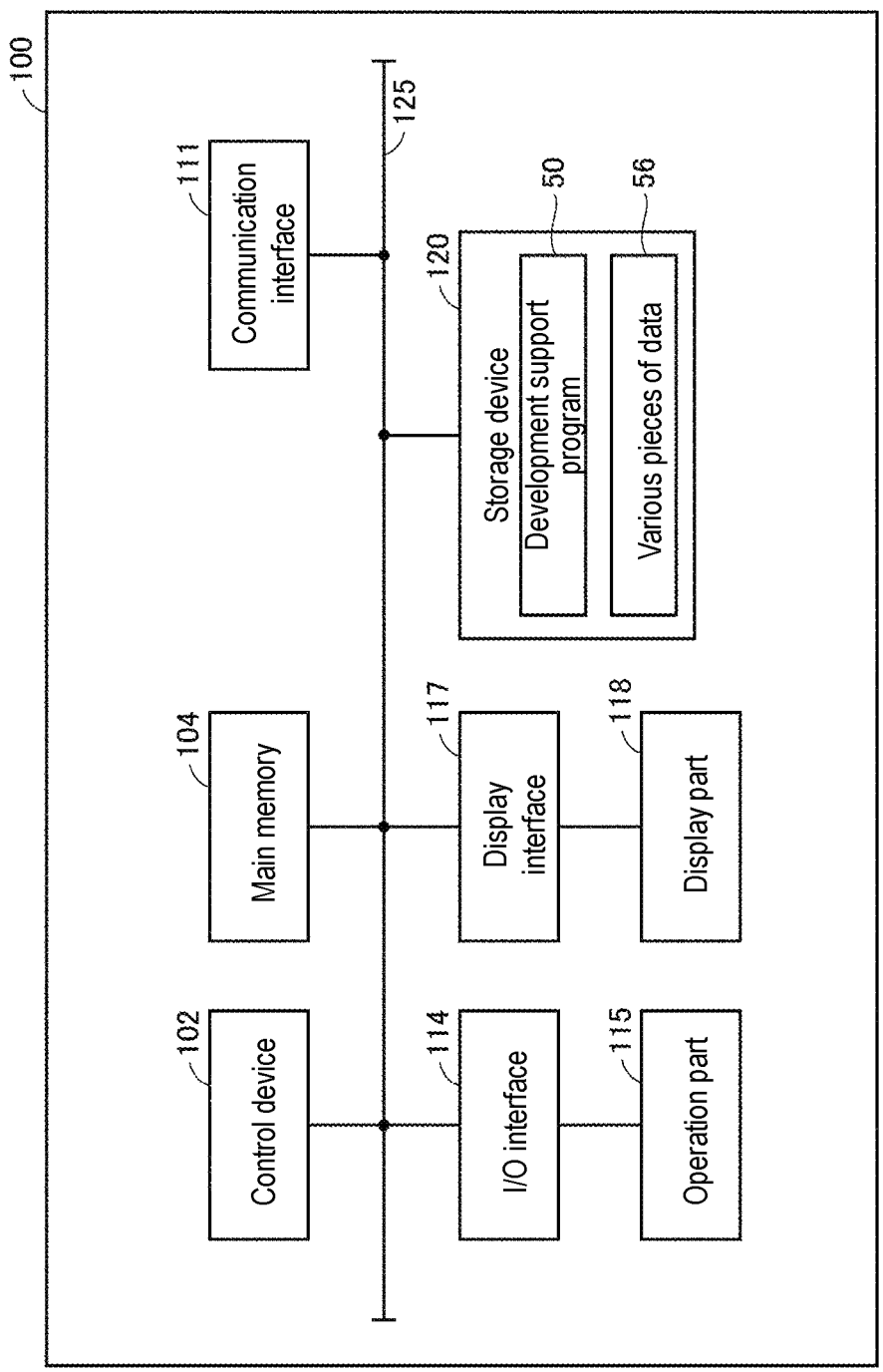
FIG. 3 is a schematic diagram illustrating an example of a hardware configuration of a development support device.
Figure 4:
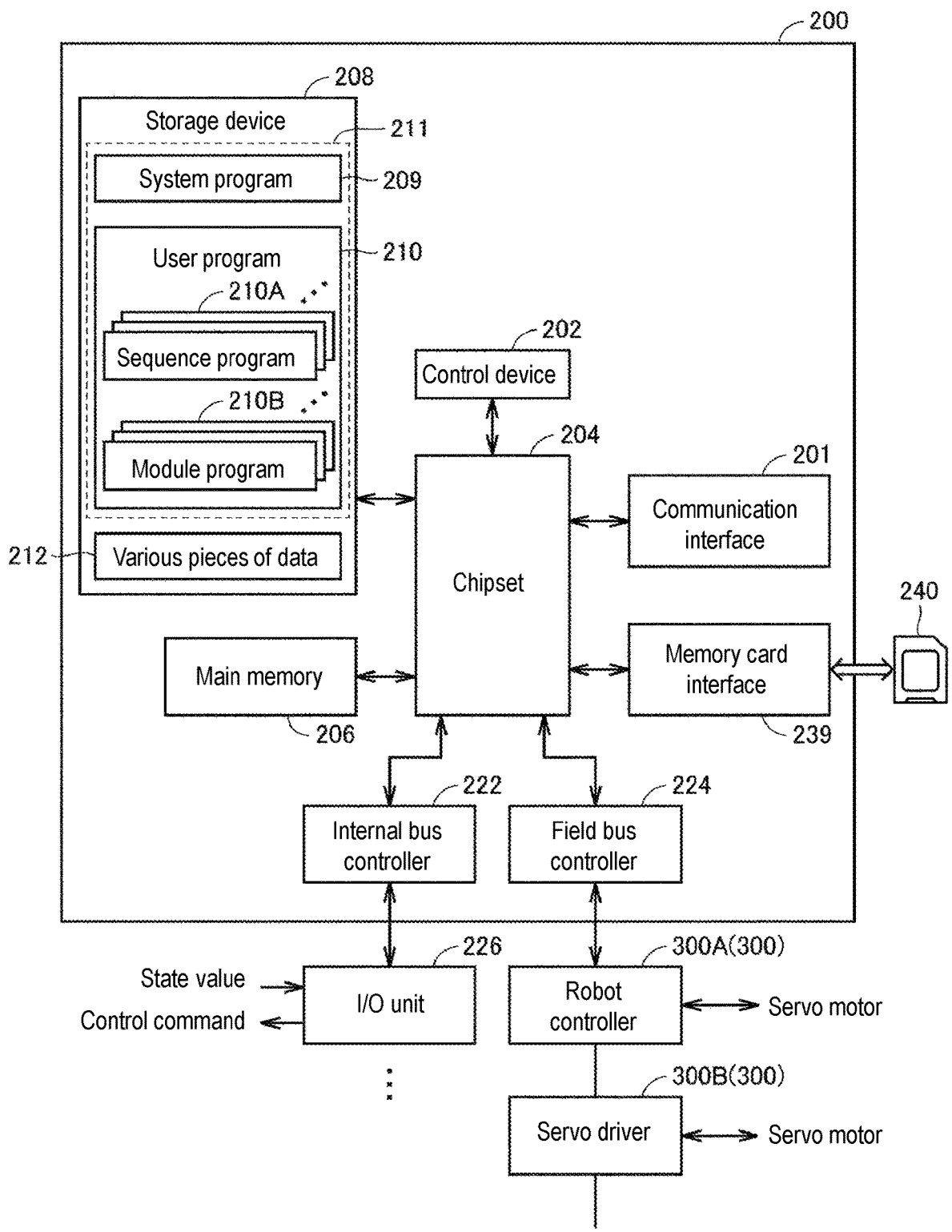
FIG. 4 is a schematic diagram illustrating an example of a hardware configuration of a controller.
Figure 5:
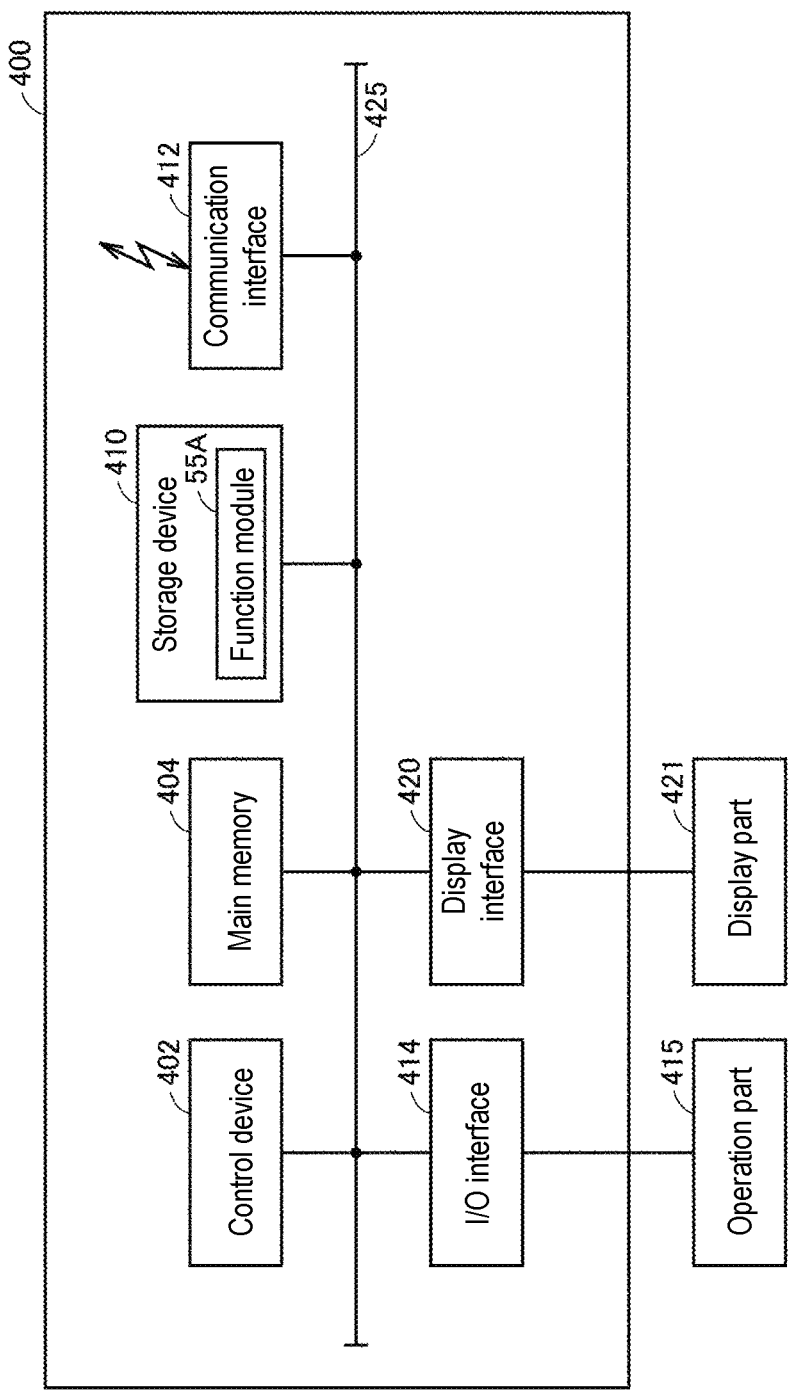
FIG. 5 is a block diagram illustrating an example of a hardware configuration of an external apparatus.

With reference to FIGS. 3 to 5, configurations of the development support device 100, the controller 200, and the external apparatus 400 illustrated in FIG. 2 will be described in order.

C1. Hardware Configuration of Development Support Device 100

First, with reference to FIG. 3, a hardware configuration of the development support device 100 will be described. FIG. 3 is a schematic diagram illustrating an example of a hardware configuration of the development support device 100.

The development support device 100 is formed of, for example, a computer configured according to a general-purpose computer architecture. The development support device 100 includes a control device 102 such as a central processing unit (CPU) or a micro-processing unit (MPU), a main memory 104, a communication interface 111, an input/output (I/O) interface 114, a display interface 117, and a nonvolatile storage device 120. These components are communicably connected to each other via an internal bus 125.

The control device 102 loads the development support program 50 stored in the storage device 120 to the main memory 104 and executes the development support program 50 to start the development tool for the user program 210 (refer to FIG. 2). The storage device 120 stores not only the development support program 50 but also various pieces of data 56 for generating the function module 55B (refer to FIG. 1) as a wrapper module.

The communication interface 111 exchanges data with other communication apparatuses via a network. The other communication apparatuses include, for example, the controller 200, the external apparatus 400, and a server. The development support device 100 may be configured to be able to download various programs such as the development support program 50 from the other communication apparatuses via the communication interface 111.

The I/O interface 114 is connected to an operation part 115, and fetches a signal indicating a user operation from the operation part 115. The operation part 115 is typically formed of a keyboard, a mouse, a touch panel, a touch pad, and the like, and receives an operation from the user. The operation part 115 may be configured integrally with the development support device 100, and may be configured separately from the development support device 100.

The display interface 117 is connected to a display part 118, and transmits an image signal for displaying an image to the display part 118 in response to a command from the control device 102 or the like. The display part 118 is formed of a liquid crystal display (LCD), an organic electroluminescence (EL) display, or the like, and presents various pieces of information to the user. The display part 118 may be configured integrally with the development support device 100, and may be configured separately from the development support device 100.

C2. Hardware Configuration of Controller 200

Next, with reference to FIG. 4, a hardware configuration of the controller 200 will be described. FIG. 4 is a schematic diagram illustrating an example of a hardware configuration of the controller 200.

The controller 200 includes a communication interface 201, a control device 202 such as a CPU or an MPU, a chipset 204, a main memory 206, a nonvolatile storage device 208, an internal bus controller 222, a field bus controller 224, and a memory card interface 239.

The control device 202 reads a control program 211 stored in the storage device 208, and loads the control program 211 to the main memory 206 to be executed, and thus realizes any control for the drive apparatus 300 such as the robot controller 300A or the servo driver 300B. The control program 211 includes various programs for controlling the controller 200. As an example, the control program 211 includes a system program 209 and a user program 210. The system program 209 includes command codes for providing a fundamental function of the controller 200, such as data input and output processes or execution timing control. The user program 210 is downloaded from the development support device 100. The user program 210 is freely designed in accordance with a control target, and includes a sequence program 210A for executing sequence control and a motion program 210B for executing motion control.

The chipset 204 controls each component to realize the overall process of the controller 200.

The storage device 208 stores the control program 211 and various pieces of data 212 used by the controller 200.

The internal bus controller 222 is an interface that exchanges data with various devices that are connected to the controller 200 via an internal bus. An I/O unit 226 as an example of such a device is connected.

The field bus controller 224 is an interface that exchanges data with the various drive apparatuses 300 that are connected to the controller 200 via a field bus. The robot controller 300A rotation the servo driver 300B as an example of such a device is connected. A drive apparatus such as a visual sensor may be connected.

The internal bus controller 222 and the field bus controller 224 may issue any commands to devices connected thereto and may also acquire any data managed by the devices. At least one of the internal bus controller 222 and the field bus controller 224 functions as an interface exchanging data with the robot controller 300A or the servo driver 300B.

The communication interface 201 controls exchange of data via various wired/wireless networks. The controller 200 performs communication with the development support device 100 or the external apparatus 400 via the communication interface 201.

The memory card interface 239 is configured to be able to attach and detach a memory card 240 (for example, an SD card) that is an example of an external storage medium thereto and therefrom, and can write data into the memory card 240 and read data from the memory card 240.

C3. Hardware Configuration of External Apparatus 400

Next, with reference to FIG. 5, a hardware configuration of the external apparatus 400 will be described. FIG. 5 is a block diagram illustrating an example of a hardware configuration of the external apparatus 400.

The external apparatus 400 has a hardware configuration having a general-purpose architecture. In other words, the external apparatus 400 is mounted as a kind of personal computer. However, the external apparatus 400 may be mounted by using dedicated hardware instead of general-purpose hardware.

More specifically, the external apparatus 400 includes a control device 402 such as a CPU or an MPU, a main memory 404, a nonvolatile storage device 410, a communication interface 412, an I/O interface 414, and a display interface 420. These components are connected to each other via an internal bus 425 to be able to perform data communication.

The control device 402 reads a control program (not illustrated) stored in the storage device 410, loads the control program to the main memory 404 to be executed, and thus controls the external apparatus 400. In other words, the control device 402 realizes a control part executing control calculation in cooperation with the main memory 404 and the storage device 410.

The communication interface 412, the I/O interface 414, and a field bus interface 416 relay data exchange between the external apparatus 400 and other communication apparatuses.

More specifically, the communication interface 412 relays communication with the controller 200 via the network NW1 (refer to FIG. 2). The communication interface 412 may employ a component that can perform communication conforming to, for example, EtherNET.

The I/O interface 414 is connected to an operation part 415, and fetches a signal indicating a user operation from the operation part 415. The operation part 415 is typically formed of a keyboard, a mouse, a touch panel, a touch pad, and the like, and receives an operation from the user. The operation part 415 may be configured integrally with the external apparatus 400, and may be configured separately from the external apparatus 400.

The display interface 420 is connected to a display part 421, and transmits an image signal for displaying an image to the display part 421 in response to a command from the control device 402 or the like. The display part 421 is formed of an LCD, an organic EL display, or the like, and presents various pieces of information to the user. The display part 421 may be configured integrally with the external apparatus 400, and may be configured separately from the external apparatus 400.

D. Functional Configuration of Development Support Device 100

Figure 6:
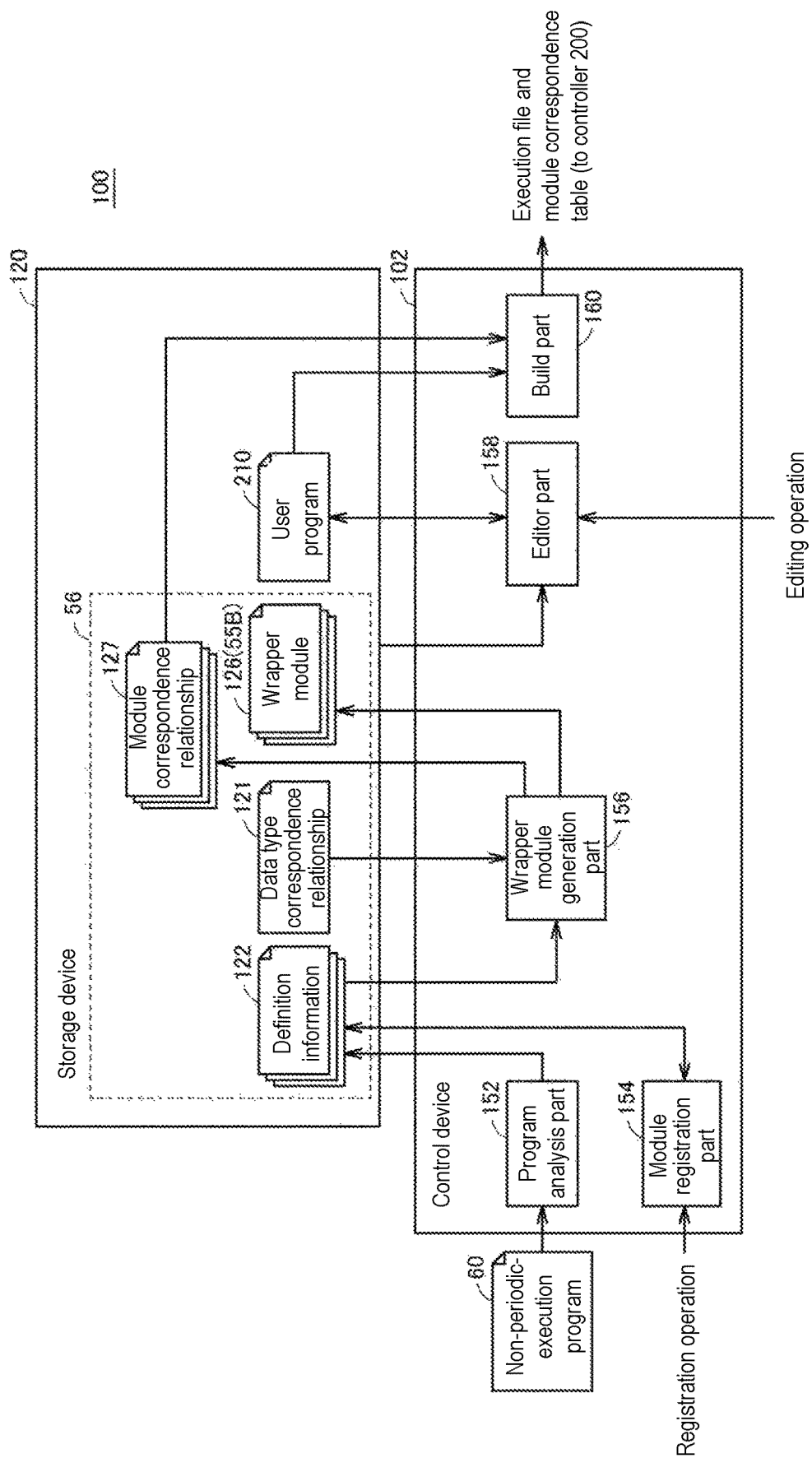
FIG. 6 is a diagram illustrating an example of a functional configuration of the development support device.

With reference to FIG. 6, a functional configuration of the development support device 100 will be described. FIG. 6 is a diagram illustrating an example of a functional configuration of the development support device 100.

The development support device 100 includes the control device 102 and the storage device 120 as a hardware configuration. The control device 102 includes a program analysis part 152, a module registration part 154, a wrapper module generation part 156, an editor part 158, and a build part 160 as a functional configuration. The storage device 120 stores the various pieces of data 56 (refer to FIG. 3) and the user program 210. The various pieces of data 56 include the data type correspondence relationship 121, the definition information 122, a wrapper module 126, and a module correspondence relationship 127.

Hereinafter, functions of the program analysis part 152, the module registration part 154, the wrapper module generation part 156, the editor part 158, and the build part 160 will be described in order.

D1. Program Analysis Part 152

Figure 7:
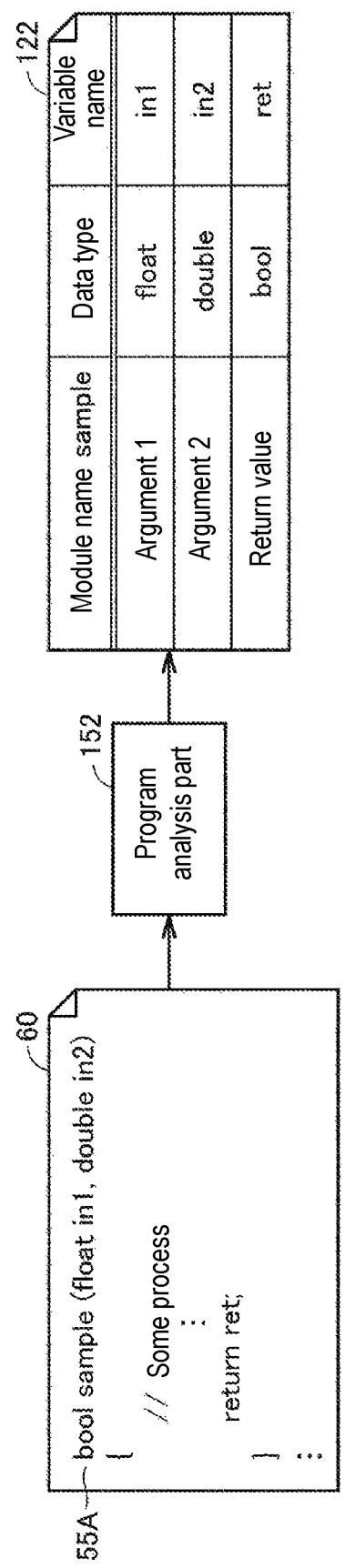
FIG. 7 is a diagram for describing a function of a program analysis part.

First, with reference to FIG. 7, the program analysis part 152 illustrated in FIG. 6 will be described. FIG. 7 is a diagram for describing a function of the program analysis part 152.

The program analysis part 152 analyzes a non-periodic-execution program 60 to automatically generate the definition information 122 (refer to FIG. 1). More specifically, the program analysis part 152 specifies a declaration portion of the function module 55A (for example, a function) from the non-periodic-execution program 60. Next, the program analysis part 152 extracts, from the specified declaration portion, a module name of the function module 55A, a data type of an argument for the function module 55A, a variable name of the argument for the function module 55A, and a data type of a return value for the function module 55A. In the example illustrated in FIG. 7, "sample" is extracted as the module name, the "float" type and the "double" type are extracted as the data type of the argument, "in1" and "in2" are extracted as the variable name of the argument, and "bool" is extracted as the data type of the return value.

The program analysis part 152 analyzes an internal description of the function module 55A to acquire the variable name of the return value. As an example, the program analysis part 152 retrieves a predefined keyword (for example, "return"), and acquires a description following the keyword as the variable name of the return value. In the example illustrated in FIG. 7, "ret" is acquired as the variable name of the return value.

The program analysis part 152 correlates the module name "sample", the data types "float" and "double" of the arguments, the variable names "in1" and "in2" of the arguments, the data type "bool" of the return value, and the variable name "ret" of the return value with each other, and writes a correlation result into the definition information 122. The definition information 122 is stored in, for example, the storage device 120 of the development support device 100.

In the example illustrated in FIG. 7, a processing content of the function module 55A is defined in the program 60, but only the declaration portion of the function module 55A may be defined in the program 60. In this case, the program analysis part 152 reads the program 60 as a header file that defines only the declaration of the function module 55A. The header file includes the module name of the function module 55A, the data types of the arguments for the function module 55A, the variable names of the arguments for the function module 55A, and the data type of the return value for the function module 55A.

D2. Module Registration Part 154

Figure 8:
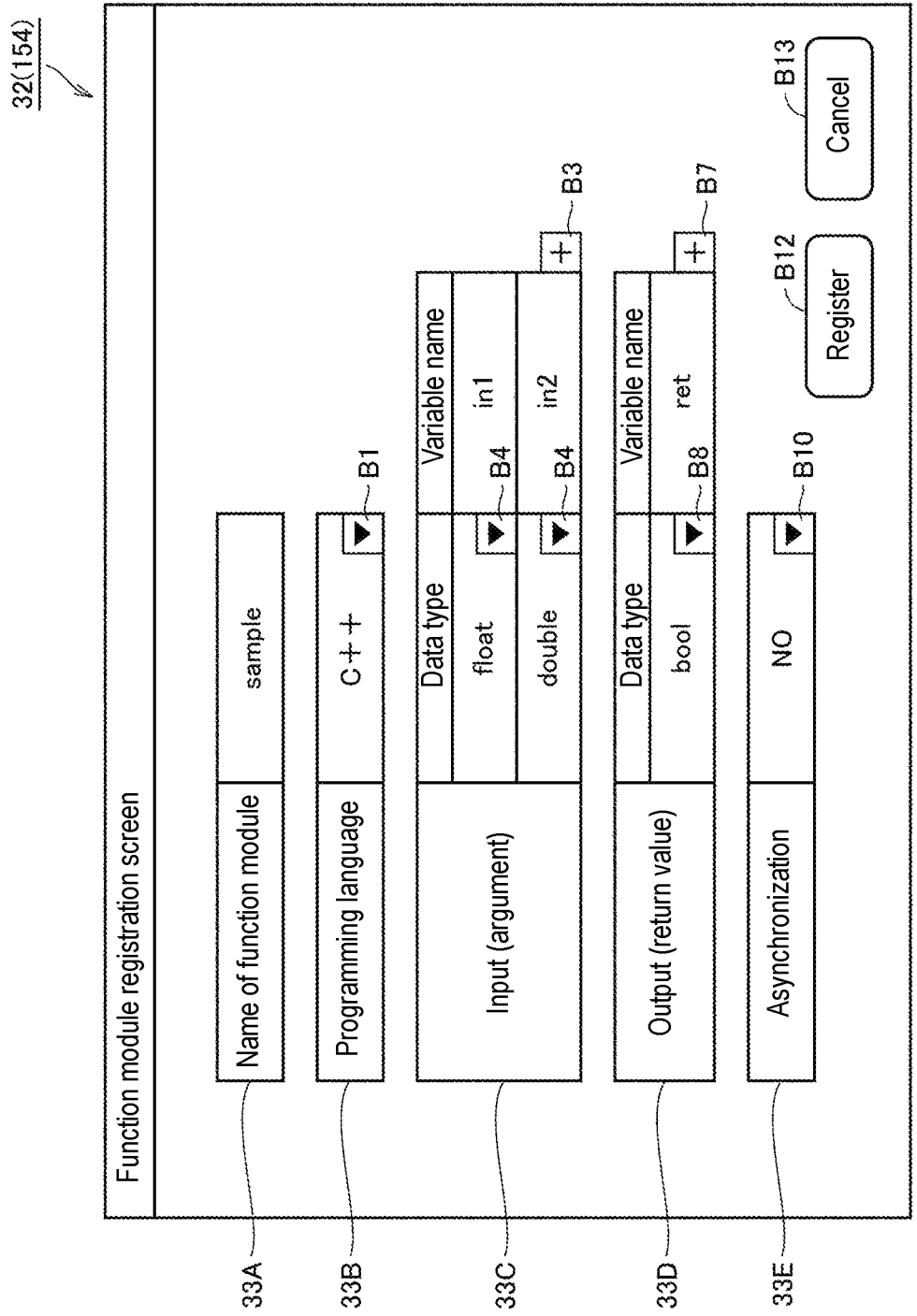
FIG. 8 is a diagram for describing a function of a module registration part.

Next, with reference to FIG. 8, the module registration part 154 illustrated in FIG. 6 will be described. FIG. 8 is a diagram for describing a function of the module registration part 154.

Hereinafter, an example of registering various pieces of information regarding the non-periodic-execution function module 55A (refer to FIG. 1) will be described, but a region target function module is not limited to the function module 55A.

The module registration part 154 is, for example, a registration screen 32 provided by the development support program 50. The registration screen 32 includes input regions 33A to 33E. An operation on the registration screen 32 is performed by using, for example, the operation part 115 (refer to FIG. 3) of the development support device 100.

The input region 33A receives input of a name of the function module 55A. The input of the name is performed by inputting text.

The input region 33B receives input of the type of programming language of the function module 55A. As an example, an expansion button B1 is correlated with the input region 33B. When a designer presses the expansion button B1, various predefined programming languages are displayed in a list form. The designer may select one programming language from among the programming languages displayed in a list form to designate the type of programming language of the function module 55A.

The input region 33C receives input of various pieces of information regarding an argument for the function module 55A. As an example, an addition button B3 is correlated with the input region 33C. When the designer presses the addition button B3, argument registration fields are added to the input region 33C. The designer may input a data type of an argument and a variable name of the argument in the argument registration fields. An expansion button B4 is correlated with each of the argument registration fields. When the designer presses the expansion button B4, data types that are usable in the programming language designated in the input region 33B are displayed in a list form. The designer may select one data type from among the data types displayed in a list form to designate a data type of the argument. The designer may input a variable name of the argument in correlation with the designated data type. The input of the variable name is performed by inputting text.

The input region 33D receives input of various pieces of information regarding a return value for the function module 55A. As an example, an addition button B7 is correlated with the input region 33D. When the designer presses the addition button B7, a return value registration field is added to the input region 33D. The designer may input a data type of a return value and a variable name of the return value in the return value registration field. An expansion button B8 is correlated with each return value registration field. When the designer presses the expansion button B8, data types that are usable in the programming language designated in the input region 33B are displayed in a list form. The designer may select one data type from among the data types displayed in a list form to designate a data type of the return value. The designer may input a variable name of the return value in correlation with the designated data type. The input of the variable name is performed by inputting text.

The input region 33E receives selection of whether or not execution of the function module 55A is synchronized with an execution cycle of the controller 200. As an example, an addition button B10 is correlated with the input region 33E. When the designer presses the addition button B10, options such as "YES" and "NO" are displayed in a list form. In a case where the designer selects "YES", execution of the function module 55A is not synchronized with the execution cycle of the controller 200. In a case where the designer selects "NO", execution of the function module 55A is synchronized with the execution cycle of the controller 200. Details of synchronous execution/asynchronous execution of the function module 55A will be described later.

In a case where the designer presses a registration button B12, the various pieces of information that are input to the registration screen 32 are registered as the definition information 122. In the example illustrated in FIG. 8, the module registration part 154 correlates the module name "sample", the data types "float" and "double" of the arguments, the variable names "in1" and "in2" of the arguments, the data type "bool" of the return value, and the variable name "ret" of the return value with each other, and registers a correlation result as the definition information 122.

In a case where the designer presses a cancel button B13, the various pieces of information that are input to the registration screen 32 are discarded, and the registration screen 32 is closed.

D3. Wrapper Module Generation Part 156

Figure 9:
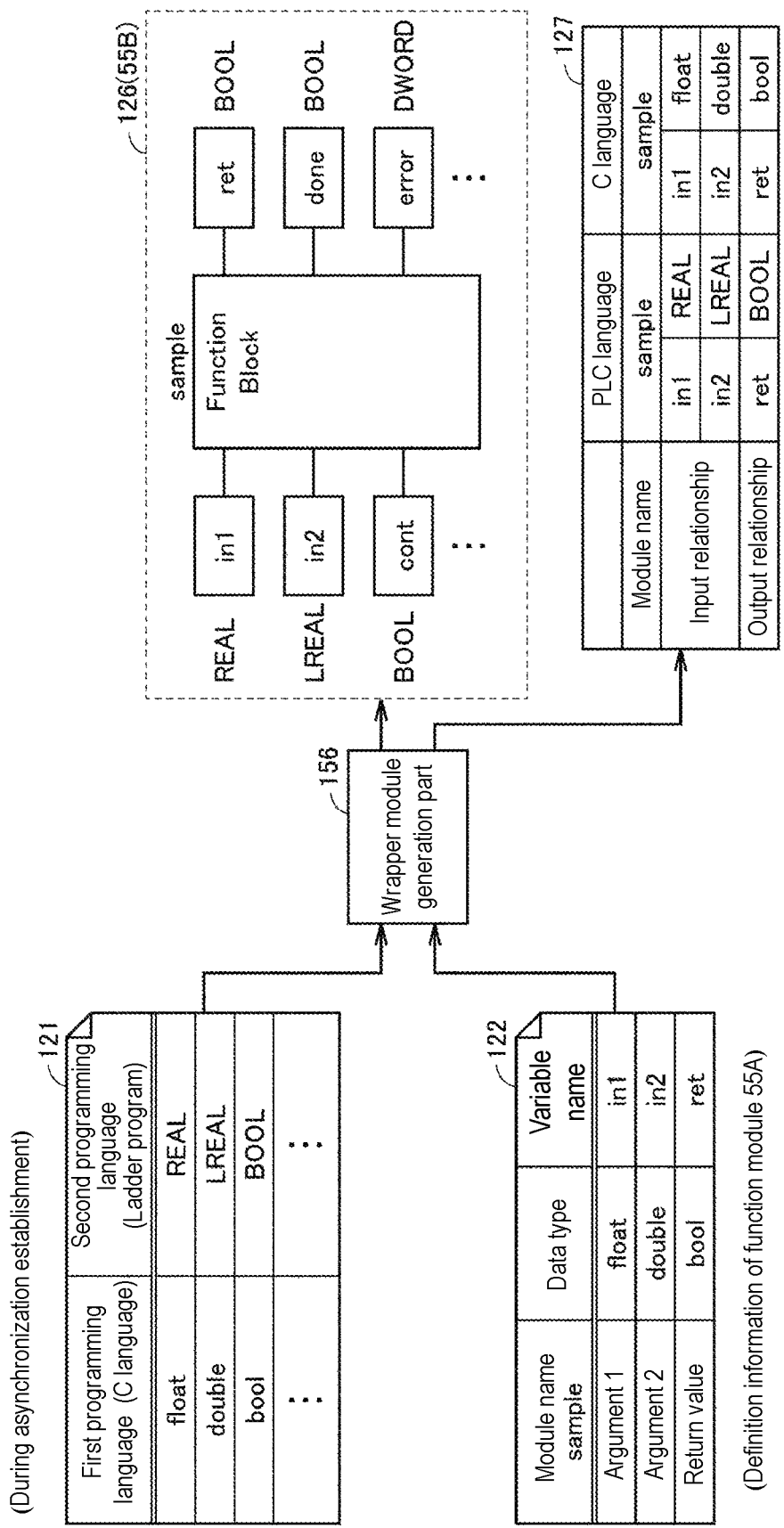
FIG. 9 is a diagram schematically illustrating a procedure of generating a function module during asynchronization establishment.
Figure 10:
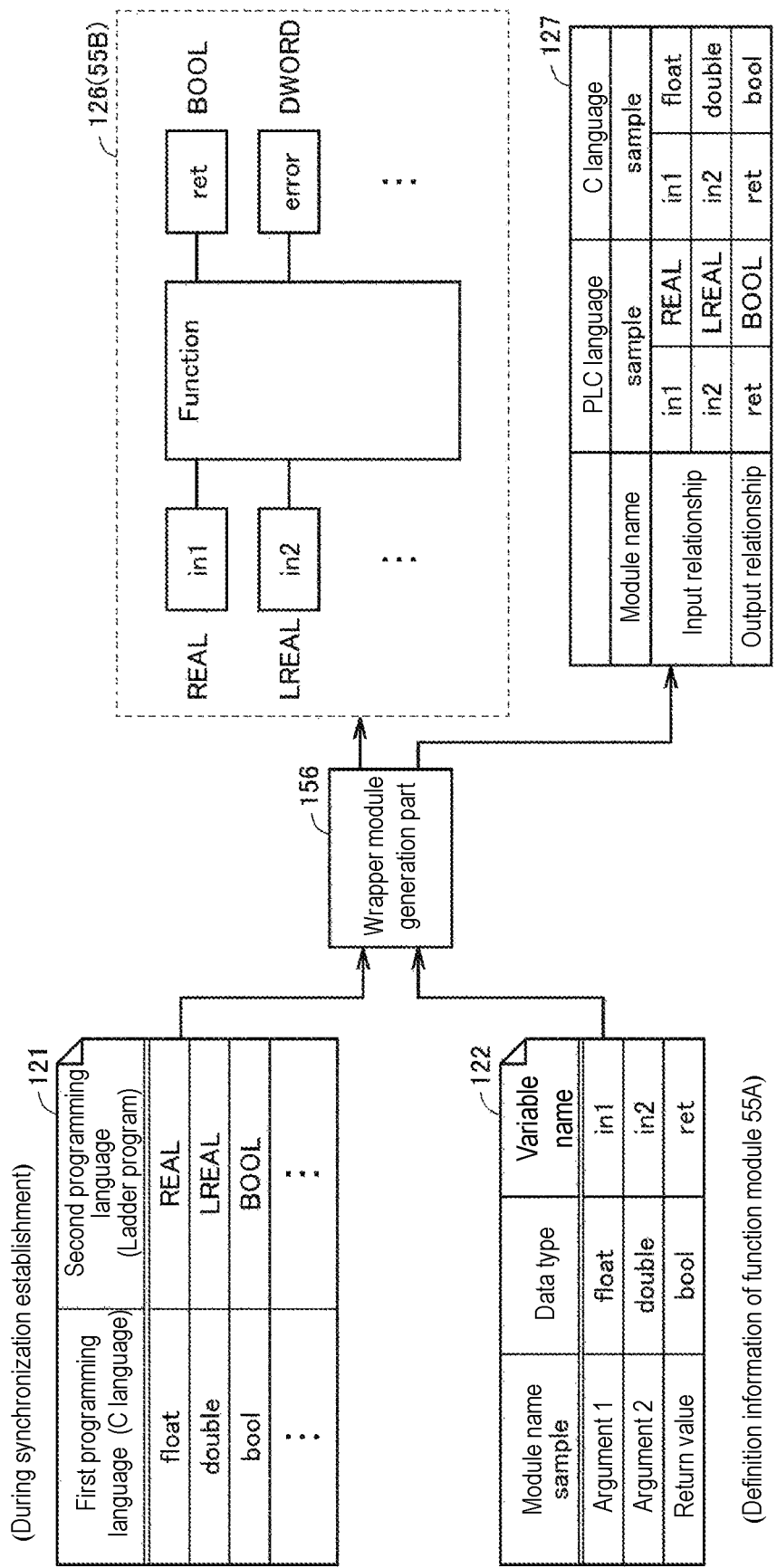
FIG. 10 is a diagram schematically illustrating a procedure of generating a function module during synchronization establishment.

Next, with reference to FIGS. 9 and 10, the wrapper module generation part 156 illustrated in FIG. 6 will be described. FIG. 9 is a diagram schematically illustrating a procedure of generating the function module 55B during asynchronization establishment. FIG. 10 is a diagram schematically illustrating a procedure of generating the function module 55B during synchronization establishment.

As illustrated in FIGS. 9 and 10, the wrapper module generation part 156 generates the periodic-execution function module 55B for invoking the function module 55A on the basis of the correspondence relationship 121 between programming-based data types and the definition information 122 of the wrapper target function module 55A.

More specifically, the wrapper module generation part 156 refers to the correspondence relationship 121 between programming-based data types to specify a data type that is in a periodic-execution programming language and corresponds to a data type of an argument defined in the definition information 122. Thereafter, the wrapper module generation part 156 establishes an input variable of the data type for reflecting a value of an argument for the function module 55A, as an input interface of the function module 55B.

A name of the input variable established for the function module 55B is freely selected. Preferably, the name of the input variable for the function module 55B is established to be the same as a name of the argument for the function module 55A. In the examples illustrated in FIGS. 9 and 10, the input variable "in1" of the "REAL" type is established for the function module 55B with respect to the data type "float" of the argument "in1" for the function module 55A. The input variable "in2" of the "LREAL" type is established for the function module 55B with respect to the data type "double" of the argument "in2" for the function module 55A. Consequently, the designer can easily understand a correspondence relationship between an argument name of the function module 55A and an input variable for the function module 55B.

The wrapper module generation part 156 refers to the correspondence relationship 121 between programming-based data types to specify a data type that is in a periodic-execution programming language and corresponds to a data type of a return value defined in the definition information 122. Thereafter, the wrapper module generation part 156 establishes an output variable of the specified data type for reflecting a return value for the function module 55A, as an output interface of the function module 55B.

A name of the output variable established for the function module 55B is freely selected. Preferably, the name of the output variable for the function module 55B is established to be the same as a name of the return value for the function module 55A. In the examples illustrated in FIGS. 9 and 10, the output variable "ret" of the data type "BOOL" is established for the function module 55B with respect to the data type "bool" of the return value "ret" for the function module 55A. Consequently, the designer can easily understand a correspondence relationship between a return value for the function module 55A and an output variable for the function module 55B.

The wrapper module generation part 156 refers to a module name defined in the definition information 122 to determine a module name of the function module 55B. The module name of the function module 55B is freely selected. Preferably, the module name of the function module 55B is established to be the same as a module name of the function module 55A. In the examples illustrated in FIGS. 9 and 10, the module name of the function module 55A is "sample", and thus the module name of the function module 55B is established to "sample". Consequently, the designer can easily understand a correspondence relationship between a module name of the function module 55A and a module name of the function module 55B.

Typically, the wrapper module generation part 156 changes input and output interfaces of the function module 55B depending on whether or not synchronization is established in the input region 33E of the registration screen 32.

During asynchronization establishment, the wrapper module generation part 156 generates the function module 55B that is operated to continuously execute a control program for the controller 200 without waiting for the completion of the execution of the function module 55A. In other words, in a case where the function module 55B is executed by the controller 200, the function module 55A that is an invocation destination is executed in parallel to execution of the control program for the controller 200.

More specifically, as illustrated in FIG. 9, during asynchronization establishment, the wrapper module generation part 156 further establishes an input variable "cont" of the "BOOL" type for an input interface of the function module 55B, and further establishes an output variable "done" of the "BOOL" type and an output variable "error" of the "DWORD" type for output interfaces of the function module 55B. The input variable "cont" is an input interface that receives execution starting of the function module 55A that is an invocation distribution. The output variable "done" is an output interface for reflecting the completion of the execution of the function module 55A invoked from the function module 55B. The output variable "error" is an output interface for reflecting whether or not the function module 55A invoked from the function module 55B has been normally executed. In a case where the function module 55A has abnormally ended, an error code is reflected in the output variable "error".

During synchronization establishment, the wrapper module generation part 156 generates the function module 55B that is operated to stop execution of the control program for the controller 200 until execution of the function module 55A is completed after the function module 55A is invoked.

More specifically, as illustrated in FIG. 10, during synchronization establishment, the wrapper module generation part 156 further establishes the output variable "error" of the "DWORD" type for an output interface of the function module 55B. The output variable "error" is an output interface for reflecting an execution result of the function module 55A invoked from the function module 55B.

The function module 55B generated by the wrapper module generation part 156 is stored as the wrapper module 126 in the storage device 120 of the development support device 100.

The wrapper module generation part 156 generates the module correspondence relationship 127 that defines a relationship between an input/output interface of the function module 55A that is a generation source and an input/output interface of the generated function module 55B. In the module correspondence relationship 127, the module name of the function module 55A is associated with the module name of the function module 55B. In the module correspondence relationship 127, the arguments for the function module 55A are associated with the input variables for the function module 55B. In the module correspondence relationship 127, the return value for the function module 55A is associated with the output value of the function module 55B. The generated module correspondence relationship 127 is stored in the storage device 120 of the development support device 100.

In the above description, a description has been made of the example in which the wrapper module generation part 156 changes input and output interfaces of the generated function module 55B on the basis of synchronization establishment/asynchronization establishment for the function module 55A, but synchronization establishment/asynchronization establishment is not necessarily required to be performed. In a certain aspect, the wrapper module generation part 156 generates the function module 55B illustrated in FIG. 9 regardless of synchronization establishment/asynchronization establishment. In another aspect, the wrapper module generation part 156 generates the function module 55B illustrated in FIG. 10 regardless of synchronization establishment/asynchronization establishment.

D4. Editor Part 158

Figure 11:
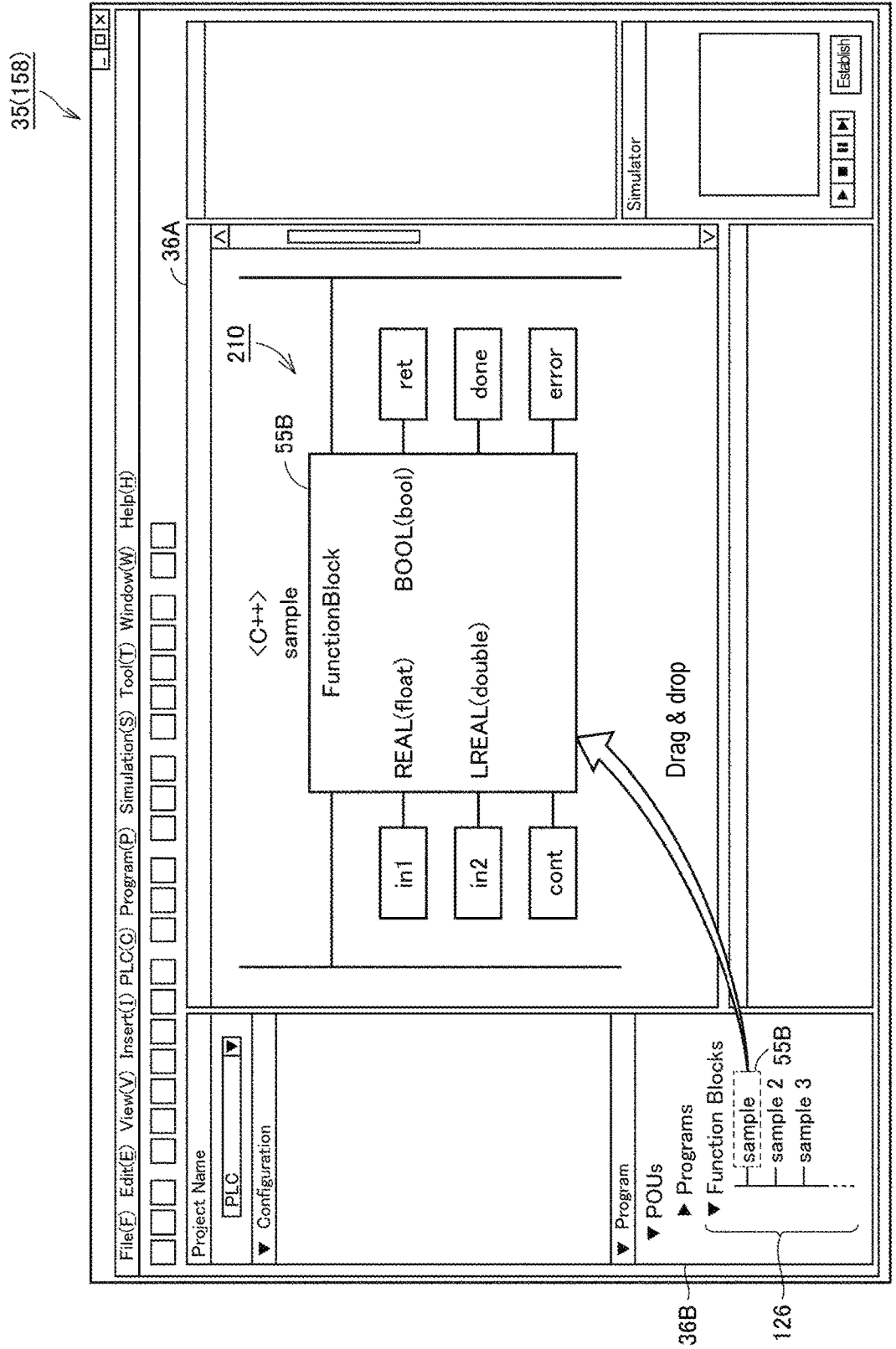
FIG. 11 is a diagram for describing a function of an editor part.

Next, with reference to FIG. 11, the editor part 158 illustrated in FIG. 6 will be described. FIG. 11 is a diagram for describing a function of the editor part 158.

The editor part 158 receives an editing operation for the user program 210. The editor part 158 is, for example, a design screen 35 provided by the development support program 50.

The design screen 35 includes an editing region 36A for the user program 210 and a display region 36B in which function block names are displayed in a list form. A function block displayed in the display region 36B includes the wrapper module 126 generated by the wrapper module generation part 156. As an example, the wrapper module 126 includes the function module 55B. For example, when the function module 55B displayed in the display region 36B is dragged and dropped into the editing region 36A, the function module 55B is displayed in the editing region 36A.

As described above, the designer may freely incorporate the wrapper module 126 into the user program 210. In this case, the designer does not have to worry about the type of programming language of a function module invoked from the wrapper module 126. In other words, the designer can use a non-periodic-execution function module by using the periodic-execution user program 210 without having the knowledge about the non-periodic-execution programming language.

Typically, the editor part 158 displays property information regarding the function module 55A that is an invocation destination in correlation with the function module 55B when the function module 55B as the wrapper module 126 is displayed. As an example, the displayed property information includes, for example, the type of programming language of the function module 55A that is an invocation destination. In the example illustrated in FIG. 11, "C++" is displayed. The displayed property information may include a data type of an argument for the function module 55A that is an invocation destination, a data type of a return value for the function module 55A that is an invocation destination, a module name of the function module 55A that is an invocation destination, and the like. Display and non-display of the property information are switched as appropriate through a user operation.

The editor part 158 makes a display aspect of the wrapper module 126 different from a display aspect of another function module. As an example, the wrapper module 126 is displayed in a color different from that of another function module. Alternatively, the wrapper module 126 may be displayed in a font different from that of another function module.

In the example illustrated in FIG. 11, a description has been made of the example in which the wrapper module 126 is incorporated into the user program 210 as a ladder program, but the wrapper module 126 may be incorporated into the user program 210 in an ST language. Since the ST language is described by a character string, if the property information regarding the function module 55A that is an invocation destination is displayed without any change on a program design screen, it is difficult to see a program that is being edited. Thus, the property information is displayed by ToolTip. More specifically, the editor part 158 displays the property information regarding the function module 55A that is an invocation destination on a separate screen on the basis of the fact that the designer has placed a cursor on the wrapper module 126 in the design screen.

The property information displayed by ToolTip includes, for example, the type of programming language of the function module 55A that is an invocation destination, a data type of an argument for the function module 55A that is an invocation destination, a data type of a return value for the function module 55A that is an invocation destination, and a module name of the function module 55A that is an invocation destination.

The editor part 158 makes a display aspect of the wrapper module 126 written in the ST language different from a display aspect of another function module. As an example, the wrapper module 126 is displayed in a color different from that of another function module. Alternatively, the wrapper module 126 may be displayed in a font different from that of another function module.

D5. Build Part 160

Next, the build part 160 illustrated in FIG. 6 will be described.

In a case where the designer performs a build operation in the design screen 35 (refer to FIG. 11), the build part 160 builds the user program 210 designed in the design screen 35, and generates an execution file of the user program 210. Thereafter, in a case where the designer performs a transmission operation in the design screen 35 (refer to FIG. 11), the build part 160 transmits the execution file of the user program 210 and the module correspondence relationship 127 (refer to FIGS. 9 and 10) to the controller 200.

The module correspondence relationship 127 may be transmitted in a state of being incorporated into the execution file of the user program 210 to the controller 200, and may be transmitted separately from the execution file of the user program 210 to the controller 200.

E. Control Structure of Development Support Device 100

Figure 12:
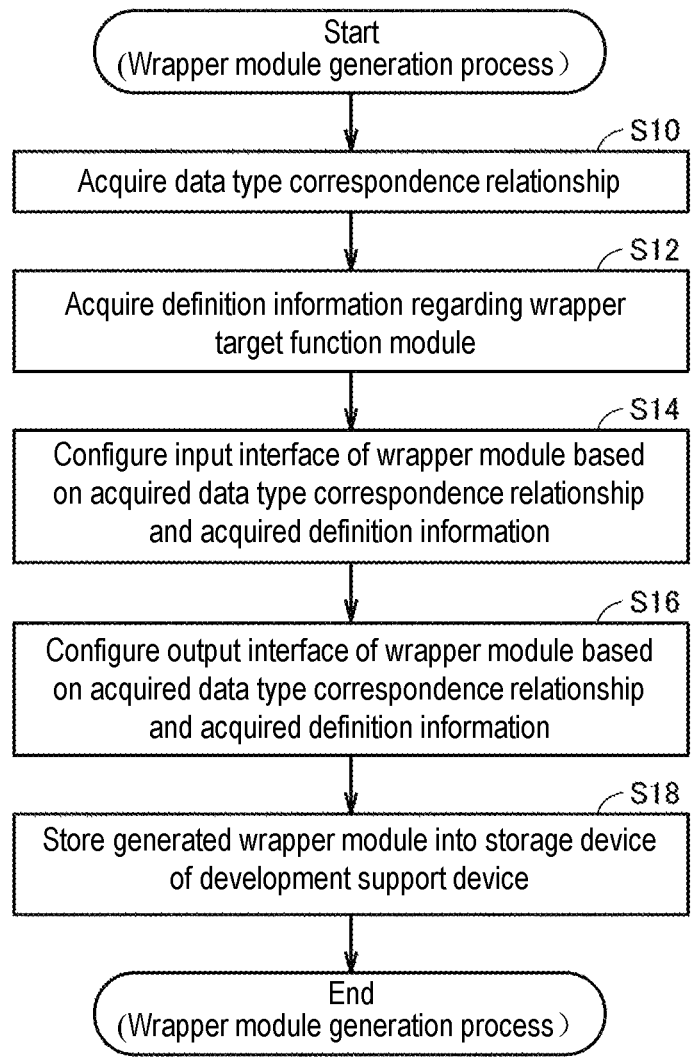
FIG. 12 is a flowchart illustrating some processes executed by the development support device.

With reference to FIG. 12, a control structure of the development support device 100 will be described. FIG. 12 is a flowchart illustrating some processes executed by the development support device 100. The processes illustrated in FIG. 12 are realized when the control device 102 of the development support device 100 functions as the wrapper module generation part 156 (refer to FIG. 6). In another aspect, some or all of the processes may be executed by a circuit element or other hardware.

In step S10, the control device 102 acquires the correspondence relationship 121 (refer to FIG. 9) defining a relationship between a data type usable in a non-periodic-execution programming language and a data type usable in a periodic-execution programming language.

In step S12, the control device 102 acquires the definition information 122 (refer to FIG. 9) regarding the wrapper target function module 55A. The definition information 122 includes a module name of the function module 55A, a data type of an argument for the function module 55A, a variable name of the argument for the function module 55A, a data type of a return value for the function module 55A, a variable name of the return value for the function module 55A, and the like.

In step S14, the control device 102 specifies a data type that is in a periodic-execution programming language and corresponds to the data type of the argument for the function module 55A on the basis of the data type correspondence relationship 121 acquired in step S10 and the definition information 122 acquired in step S12. Thereafter, the control device 102 establishes an input variable of the specified data type as an input interface of the function module 55B. The input variable is an input interface for reflecting a value of the argument for the function module 55A.

In a case where asynchronization is established for the wrapper target function module 55A, the control device 102 further establishes an input variable "cont" of the "BOOL" type for an input interface of the function module 55B (refer to FIG. 9). The input variable "cont" is an input interface that receives an execution start command for the function module 55A that is an invocation distribution. On the other hand, in a case where synchronization is established for the wrapper target function module 55A, the control device 102 does not establish the input variable "cont" of the "BOOL" type for an input interface of the function module 55B (refer to FIG. 10).

In step S16, the control device 102 specifies a data type that is in a periodic-execution programming language and corresponds to the data type of the return value for the function module 55A on the basis of the data type correspondence relationship 121 acquired in step S10 and the definition information 122 acquired in step S12. Thereafter, the control device 102 establishes an output variable of the specified data type as an output interface of the function module 55B. The output variable is an output interface for reflecting the return value for the function module 55A.

The control device 102 further establishes the output variable "error" of the "DWORD" type for an output interface of the function module 55B (refer to FIGS. 9 and 10). The output variable "error" is an output interface for reflecting whether or not the function module 55A invoked from the function module 55B has been normally executed. In a case where the function module 55A has abnormally ended, an error code is reflected in the output variable "error".

In a case where asynchronization is established for the wrapper target function module 55A, the control device 102 further establishes an output variable "done" of the "BOOL" type for an output interface of the function module 55B (refer to FIG. 9). The output variable "done" is an output interface for reflecting the completion of the execution of the function module 55A invoked from the function module 55B. On the other hand, in a case where synchronization is established for the wrapper target function module 55A, the control device 102 does not establish the output variable "done" of the "BOOL" type for an output interface of the function module 55B (refer to FIG. 10).

In step S18, the control device 102 stores the generated function module 55B as the wrapper module 126 into the storage device 120 of the development support device 100.

F. Mounting Form

The controller 200 controls the drive apparatus 300 according to the user program 210 transmitted from the development support device 100. The user program 210 is executed by a core C1 (first control part). In a case where the function module 55B as a wrapper module included in the user program 210 is executed, the controller 200 invokes the corresponding function module 55A. The non-periodic-execution function module 55A is executed by a core C2 (second control part).

The core C1 and the core C2 operate on different types of operating systems (OSs). Typically, the core C1 operates on a first type of OS such as a real time OS, and uses a fundamental function of the OS. On the other hand, the core C2 operates on a second type of OS such as Linux (registered trademark) or Windows (registered trademark), and uses a fundamental function of the OS.

In the present specification, a system configured with two or more cores C1 and C2 (first and second control parts) will be referred to as a "control system". In other words, the concept "control system" includes a system configured with a single device including at least two cores C1 and C2, or with a first device including the core C1 and a second device including the core C2.

Hereinafter, with reference to FIGS. 13 to 15, a mounting form of the cores C1 and C2 will be described.

F1. Specific Example 1 of Mounting Form of Cores C1 and C2

Figure 13:
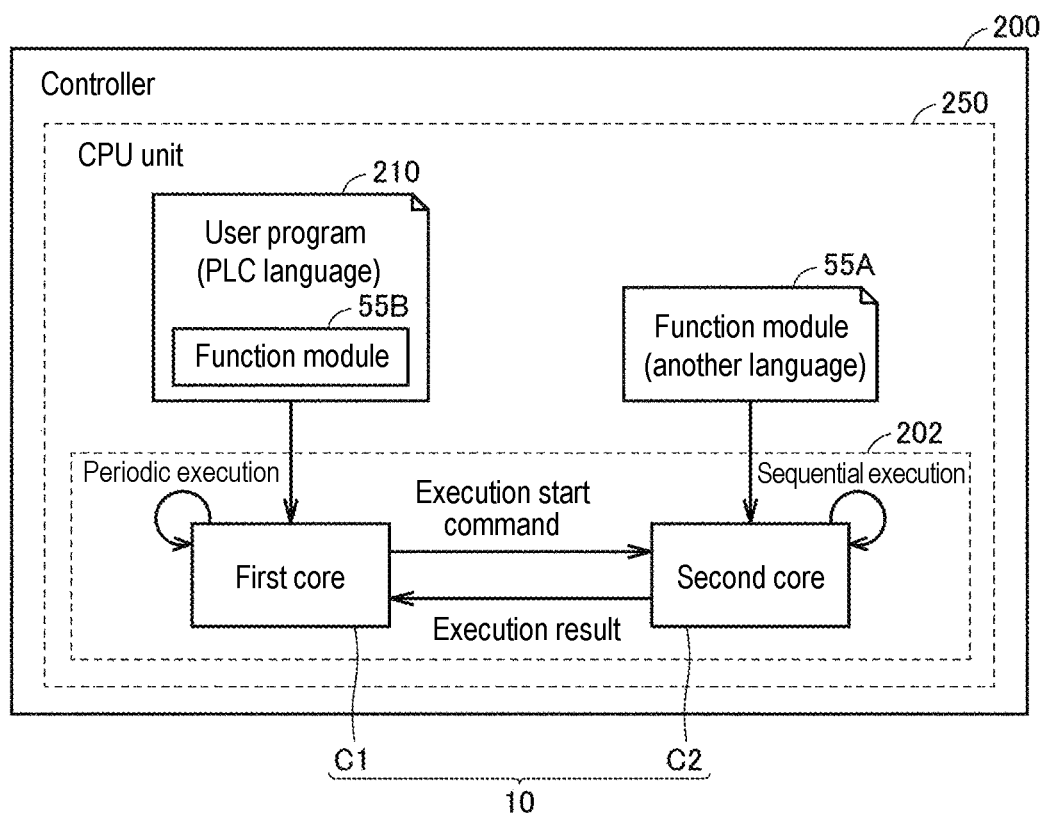
FIG. 13 is a diagram illustrating a specific example 1 of a mounting form of each core.

FIG. 13 is a diagram illustrating a specific example 1 of a mounting form of the core C1 and the core C2.

As illustrated in FIG. 13, the controller 200 includes a CPU unit 250. The CPU unit 250 includes the control device 202 configured with two or more cores. As an example, the control device 202 includes the core C1 and the core C2. In the present specific example, a control system 10 is configured with a plurality of cores C1 and C2 mounted in the single control device 202.

The core C1 executes the user program 210. The user program 210 is defined by a non-periodic-execution PLC language such as a ladder program or an ST language. In a case where the function module 55B as a wrapper module is executed during execution of the user program 210, the core C1 outputs an execution start command for the corresponding non-periodic-execution function module 55A to the core C2.

The core C2 executes the function module 55A on the basis of reception of the execution start command. The function module 55A is defined by, for example, a C language, C++, Java, or Python. The core C2 outputs an execution result of the function module 55A to the core C1 on the basis of completion of the execution of the function module 55A.

As described above, in the present specific example, the core C1 that executes the periodic-execution programming language and the core C2 that executes the non-periodic-execution programming language are mounted in the single control device 102.

F2. Specific Example 2 of Mounting Form of Cores C1 and C2

Figure 14:
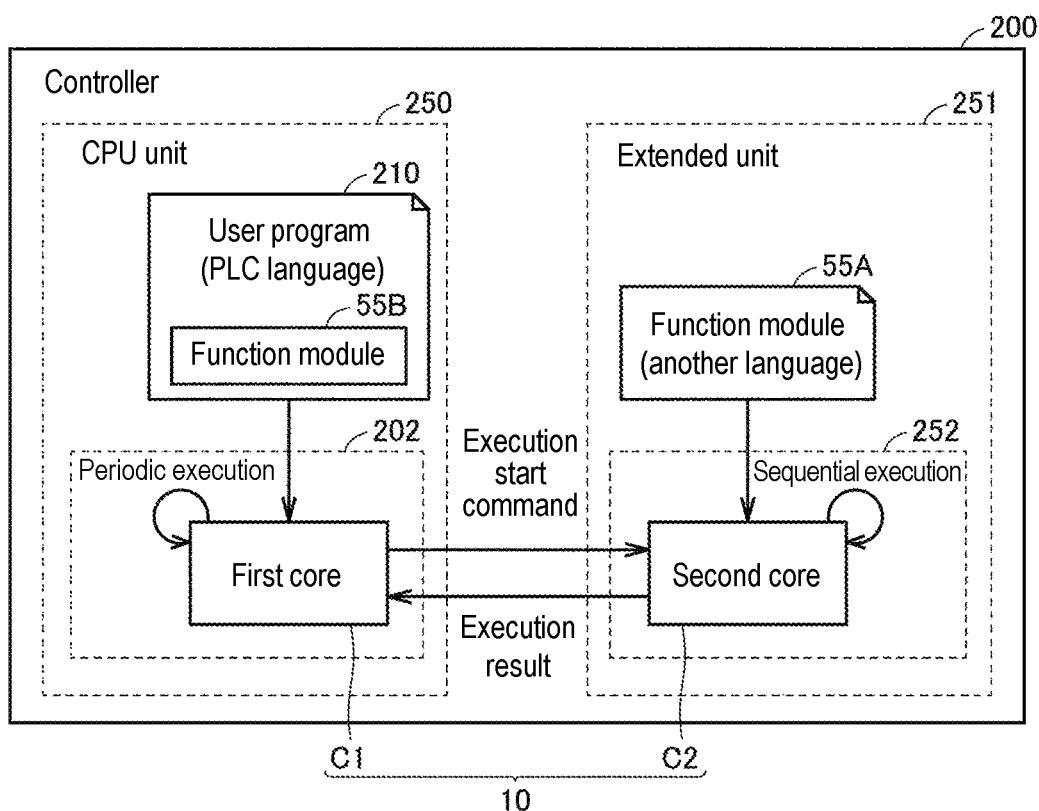
FIG. 14 is a diagram illustrating a specific example 2 of a mounting form of each core.

FIG. 14 is a diagram illustrating a specific example 2 of a mounting form of the core C1 and the core C2.

As illustrated in FIG. 14, the controller 200 includes a CPU unit 250 and an extended unit 251. The extended unit 251 is configured to be separable from the CPU unit 250, and is connected to the CPU unit 250 via a bus of the controller 200.

The CPU unit 250 includes the control device 202. The CPU unit 250 includes one or more cores C1. The core C1 executes the user program 210 that is a control program for the controller 200. The user program 210 is defined by a non-periodic-execution PLC language such as a ladder program or an ST language.

The extended unit 251 includes a control device 252 configured with one or more cores. As an example, the control device 252 includes the core C2. The core C2 executes the non-periodic-execution function module 55A. The function module 55A is defined by, for example, a C language, C++, Java, or Python.

In the present specific example, the control system 10 is configured with the core C1 mounted in the CPU unit 250 and the core C2 mounted in the extended unit 251.

In a case where the function module 55B as a wrapper module is executed during execution of the user program 210, the core C1 outputs an execution start command for the corresponding non-periodic-execution function module 55A to the core C2. The core C2 executes the function module 55A on the basis of reception of the execution start command. The core C2 outputs an execution result of the function module 55A to the core C1 on the basis of completion of the execution of the function module 55A.

As described above, in the present specific example, the core C1 that executes the periodic-execution programming language is mounted in the single control device 202 of the CPU unit 250. On the other hand, the core C2 that executes the non-periodic-execution programming language is mounted in the control device 252 of the extended unit 251.

F3. Specific Example 3 of Mounting Form of Cores C1 and C2

Figure 15:
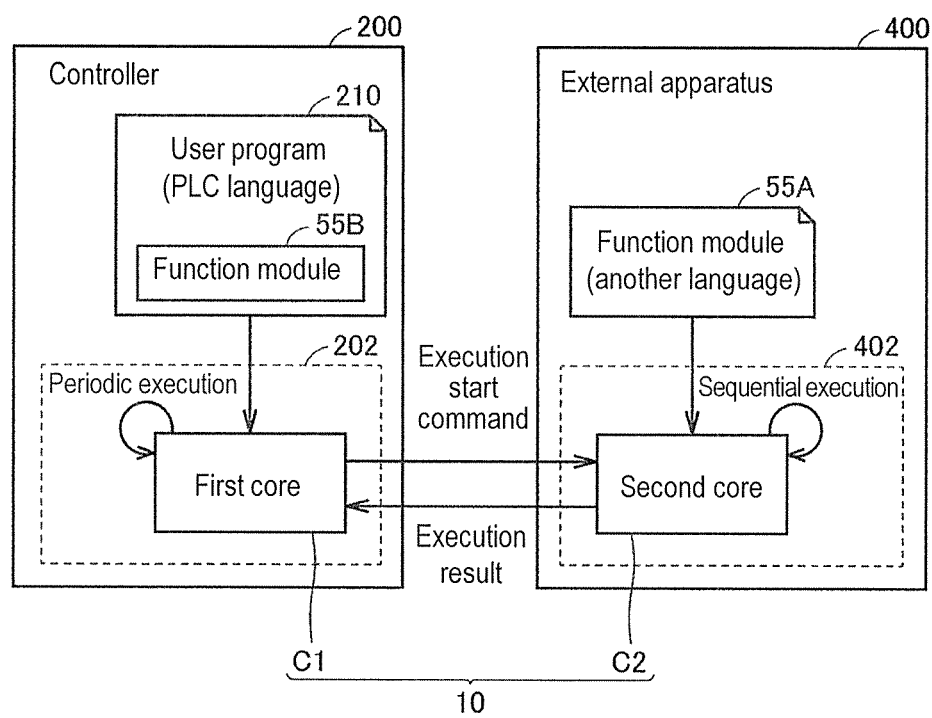
FIG. 15 is a diagram illustrating a specific example 3 of a mounting form of each core.

FIG. 15 is a diagram illustrating a specific example 3 of a mounting form of the core C1 and the core C2.

The controller 200 is configured to be communicable with the external apparatus 400. The controller 200 includes the control device 202. The control device 202 includes one or more cores C1. The core C1 executes the user program 210 that is a control program for the controller 200. The user program 210 is defined by a non-periodic-execution PLC language such as a ladder program or an ST language.

The external apparatus 400 configured to be communicable with the controller 200. The external apparatus 400 includes the control device 402 configured with one or more cores. As an example, the control device 402 includes the core C2. The core C2 executes the non-periodic-execution function module 55A. The function module 55A is defined by, for example, a C language, C++, Java, or Python.

In the present specific example, the control system 10 is configured with the core C1 mounted in the control device 202 of the controller 200 and the core C2 mounted in the control device 402 of the external apparatus 400.

In a case where the function module 55B as a wrapper module is executed during execution of the user program 210, the core C1 outputs an execution start command for the corresponding non-periodic-execution function module 55A to the core C2. The core C2 executes the function module 55A on the basis of reception of the execution start command. The core C2 outputs an execution result of the function module 55A to the core C1 on the basis of completion of the execution of the function module 55A.

As described above, in the present specific example, the core C1 that executes the periodic-execution programming language is mounted in the control device 202 of the controller 200. On the other hand, the core C2 that executes the non-periodic-execution programming language is mounted in the control device 402 of the external apparatus 400.

G. Functional Configuration of Cores C1 and C2

Figure 16:
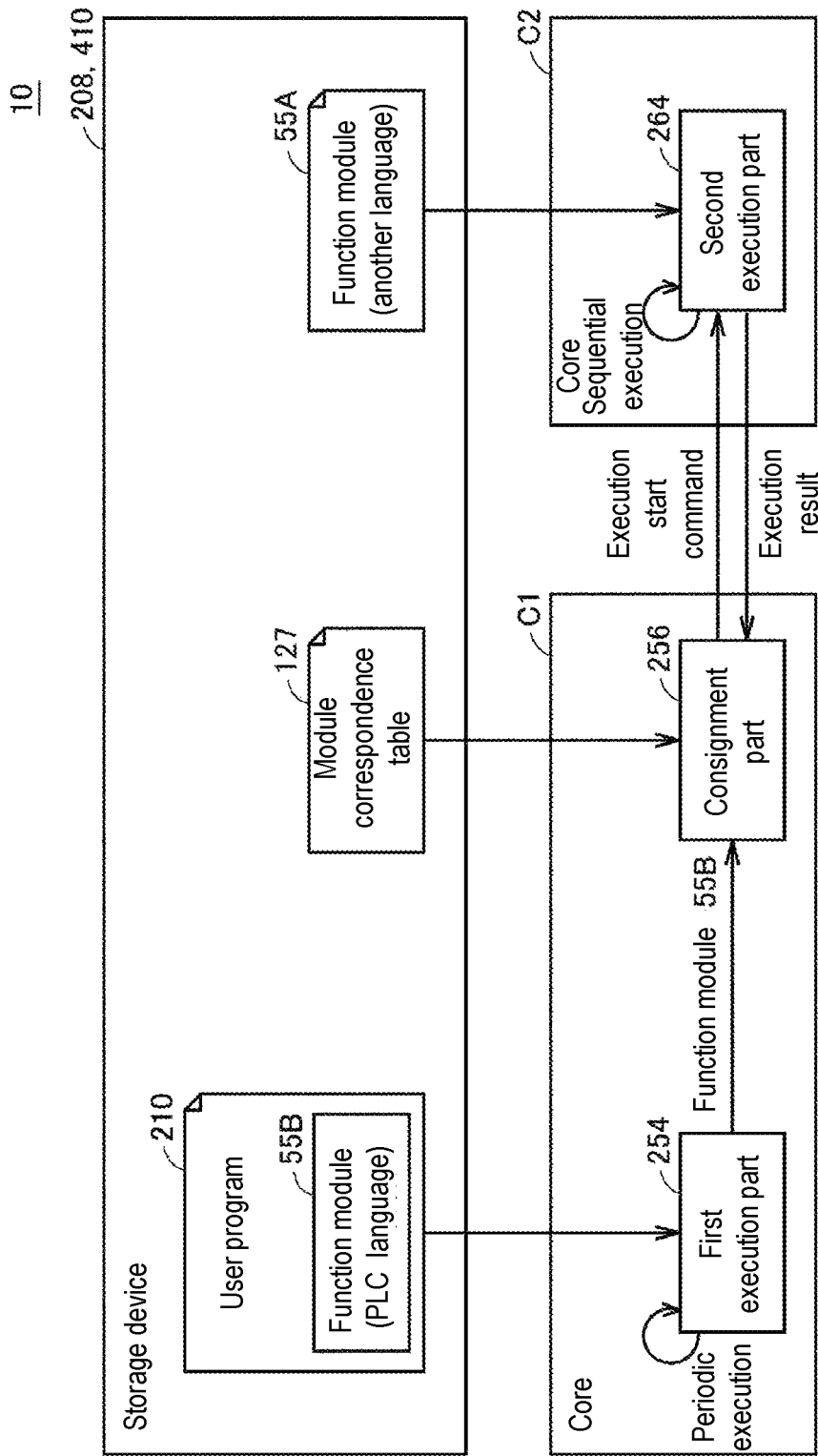
FIG. 16 is a diagram illustrating an example of a functional configuration of each core.

With reference to FIG. 16, a functional configuration of the cores C1 and C2 illustrated in FIGS. 13 to 15 will be described. FIG. 16 is a diagram illustrating an example of a functional configuration of the cores C1 and C2.

The control system 10 includes the core C1, the core C2, and the storage devices 208 and 410 as a hardware configuration. The core C1 includes a first execution part 254 and a consignment part 256 as a functional configuration. The core C2 includes a second execution part 264 as a functional configuration.

The storage device 208 of the controller 200 or the storage device 410 of the external apparatus 400 stores the function module 55A, the module correspondence relationship 127, and the user program 210. The module correspondence relationship 127 and the user program 210 are stored in, for example, the storage device 208. The module correspondence relationship 127 stored in either the storage device 208 or the storage device 410.

The first execution part 254 repeatedly executes a first line to a last line of the user program 210 every predefined cycle, and controls the drive apparatus 300 according to the user program 210. In a case where the function module 55B as a wrapper module included in the user program 210 is executed, the first execution part 254 consigns execution of the corresponding function module 55A to the consignment part 256.

The consignment part 256 has a remote procedure call (RPC) function. In other words, the consignment part 256 causes another core C2 to execute the function module 55A that is an invocation destination.

Figure 17:
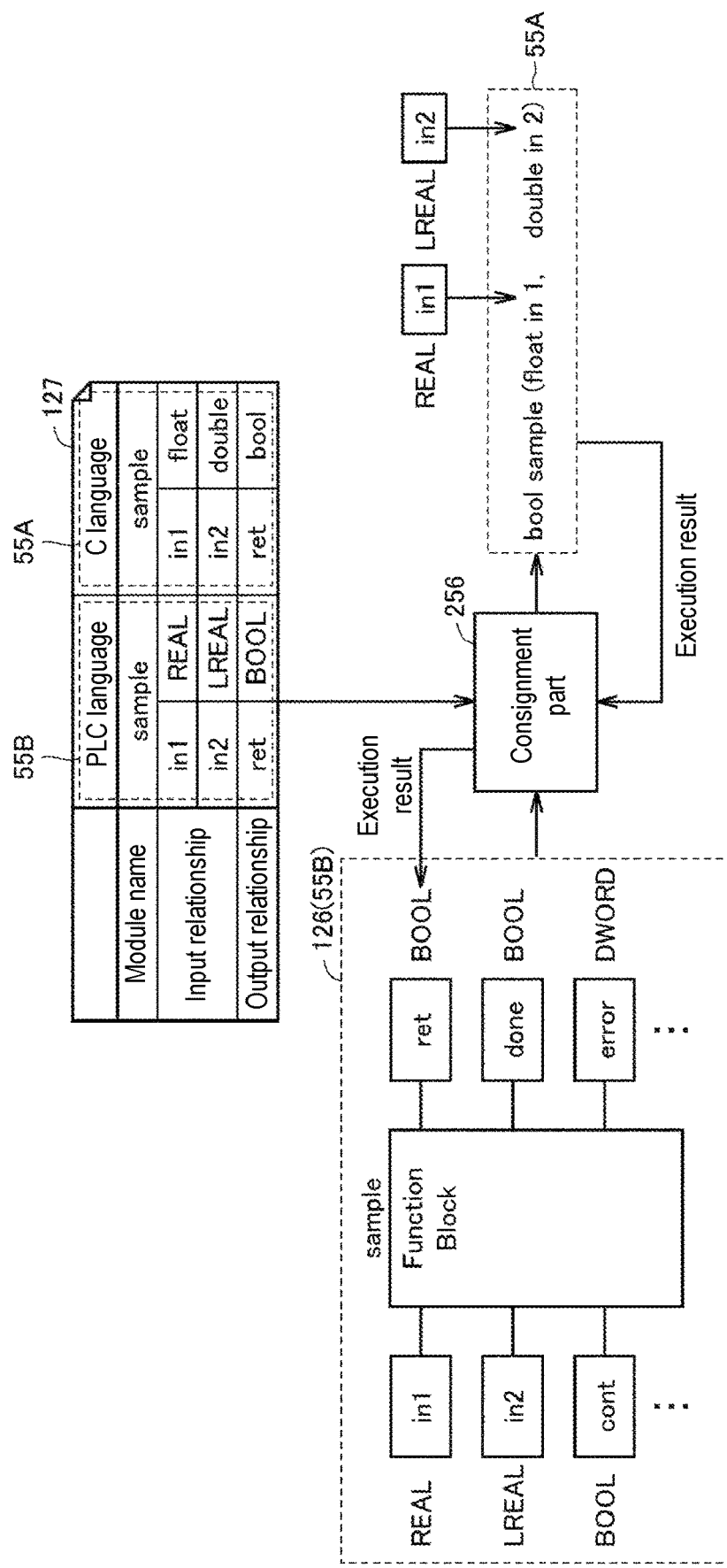
FIG. 17 is a conceptual diagram schematically illustrating a consignment process executed by a consignment part.

With reference to FIG. 17, a function of the consignment part 256 will be described. FIG. 17 is a conceptual diagram schematically illustrating a consignment process executed by the consignment part 256.

As illustrated in FIG. 17, it is assumed that the consignment part 256 receives an execution command for the function module 55A from the function module 55B that is one of the wrapper modules 126. On the basis of this fact, the consignment part 256 specifies a module name (function name) of the function module 55A that is an invocation destination, corresponding to a module name of the function module 55B by referring to the module correspondence relationship 127. In the example illustrated in FIG. 17, "sample" is specified as the module name of the function module 55A.

Thereafter, the consignment part 256 specifies an argument for the function module 55A corresponding to an input variable for the function module 55B by referring to the module correspondence relationship 127. In the example illustrated in FIG. 17, the argument "in1" of the "float" type is specified with respect to the input variable "in1" of the "REAL" type. The argument "in2" of the "double" type is specified with respect to the input variable "in2" of the "LREAL" type.

The consignment part 256 converts a value of the input variable "in1" of the "REAL" type into the "float" type according to the relationship between the specified data types, and assigns the converted value to the argument "in1" for the function module 55A. Similarly, the consignment part 256 converts a value of the input variable "in2" of the "LREAL" type into the "double" type according to the relationship between the specified data types, and assigns the converted value of the input variable "in2" to the argument "in2" for the function module 55A. As described above, the consignment part 256 converts the value of the input variable for the function module 55B in accordance with the data type of the function module 55A, and reflects the value of the input variable in the argument. Thereafter, the consignment part 256 outputs an execution start command for the function module 55A to the second execution part 264.

Referring to FIG. 16 again, the second execution part 264 reads an execution program for the invocation target function module 55A on the basis of reception of the execution start command from the consignment part 256, and sequentially executes respective lines of the execution program. In this case, the second execution part 264 outputs an execution result to the consignment part 256 on the basis of completion of execution of the execution program.

Referring to FIG. 17 again, the consignment part 256 reflects the execution result in an output variable for the function module 55B on the basis of reception of the execution result of the function module 55A from the second execution part 264. More specifically, the consignment part 256 specifies an output variable for the function module 55B corresponding to a return value for the function module 55A by referring to the module correspondence relationship 127. In the example illustrated in FIG. 17, the output variable "ret" of the "BOOL" type is specified with respect to the return value "ret" of the "bool" type. The consignment part 256 converts a value of the return value "ret" of the "bool" type into the "BOOL" type according to the relationship between the specified data types, and assigns the converted return value to the output value "ret" for the function module 55B. As described above, the consignment part 256 converts the return value for the function module 55A in accordance with the data type of the output variable for the function module 55B, and reflects the return value in the output variable.

H. Data Flow

As described above with reference to FIGS. 9 and 10, there are the wrapper module 126 for which asynchronization is established and the wrapper module 126 for which synchronization is established. In a case where the wrapper module 126 for which asynchronization is established is executed, the function module 55A that is an invocation destination is executed out of synchronization with an execution cycle of the user program 210. In a case where the wrapper module 126 for which synchronization is established is executed, the function module 55A that is an invocation destination is executed in synchronization with the execution cycle of the user program 210.

Hereinafter, with reference to FIGS. 18 and 19, a description will be sequentially made of a data flow in the control system 10 in a case where the function module 55A that is an invocation destination is asynchronously executed and a data flow in the control system 10 in a case where the function module 55A that is an invocation destination is synchronously executed.

H1. Asynchronous Execution

Figure 18:
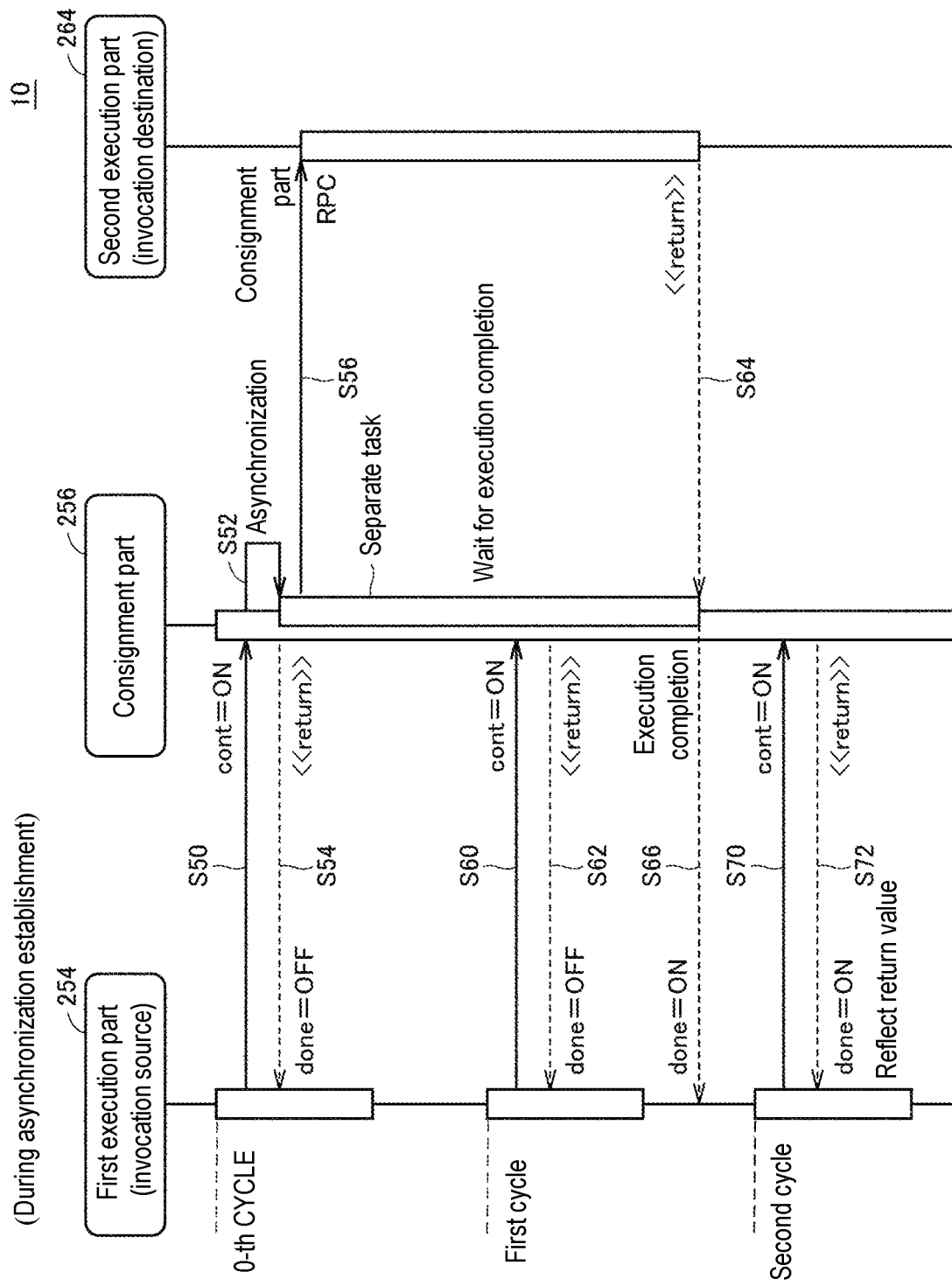
FIG. 18 is a diagram illustrating an example of a data flow in a control system in a case where a function module that is an invocation destination is asynchronously executed.

FIG. 18 is a diagram illustrating an example of a data flow in the control system 10 in a case where the function module 55A that is an invocation destination is asynchronously executed. Hereinafter, the description will be made on the basis of the function module 55A being invoked from the function module 55B that is a wrapper module.

The first execution part 254 repeatedly executes the user program 210 according to a control cycle of the controller 200. In a case of asynchronous execution, the function module 55A that is an invocation destination is executed in parallel to execution of the user program 210.

More specifically, in step S50 (a 0-th control cycle of the controller 200), it is assumed that the input variable "cont" for the function module 55B that is one of the wrapper modules 126 is "ON". As described in FIG. 9, the input variable "cont" is an input interface that receives an execution start command for the function module 55A that is an invocation destination. The input variable "cont" being "ON" indicates that execution of the function module 55A that is an invocation destination is started.

In step S52, the consignment part 256 generates a new thread separately from a thread (task) of executing the user program 210 on the basis of the input variable "cont" for the function module 55B being established to be "ON".

In step S54, the consignment part 256 establishes the output variable "done" for the function module 55B to be "OFF". As described in FIG. 9, the output variable "done" is an output interface for reflecting the completion of the execution of the function module 55A invoked from the function module 55B. The output variable "done" being "OFF" indicates that execution of the function module 55A that is an invocation destination is not completed.

In step S56, the consignment part 256 reflects the value of the input variable for the function module 55B that is an invocation source in the argument for the function module 55A that is an invocation destination as the separate thread generated in step S52, and outputs an execution start command for the function module 55A to the second execution part 264. A method of reflecting the input variable in the argument is the same as described in FIG. 17, and thus a description thereof will not be repeated.

In step S60 (a first control cycle of the controller 200), it is assumed that the input variable "cont" for the function module 55B is still "ON". In this case, since the function module 55A that is an invocation destination is being currently executed, even if the input variable "cont" for the function module 55B is established to be "ON", the consignment part 256 does nothing in particular to the second execution part 264.

In step S62, the consignment part 256 establishes the output variable "done" for the function module 55B to be "OFF". As described above, the output variable "done" being "OFF" indicates that execution of the function module 55A that is an invocation destination is not completed.

In step S64, execution of the function module 55A that is an invocation destination is assumed to be completed. On the basis of this fact, the second execution part 264 outputs an execution result of the function module 55A to the consignment part 256.

In step S66, the consignment part 256 establishes the output variable "done" for the function module 55B to be "ON" as the separate thread generated in step S52. The output variable "done" being "ON" indicates that execution of the function module 55A that is an invocation destination is completed.

In step S70 (a second control cycle of the controller 200), it is assumed that the input variable "cont" for the function module 55B is still "ON". In this case, since execution of the function module 55A that is an invocation destination has just been completed, even if the input variable "cont" for the function module 55B is established to be "ON", the consignment part 256 does nothing in particular to the second execution part 264.

In step S72, the consignment part 256 reflects the execution result (return value) of the function module 55A in the output variable "ret" for the function module 55B. A method of reflecting the return value in the output variable is the same as described in FIG. 17, and thus a description thereof will not be repeated.

As described above, during asynchronous execution, the consignment part 256 continues to execute the user program 210 until an execution result of the function module 55A is received after an execution start command for the function module 55A is output to the second execution part 264. In other words, execution of the function module 55A that is an invocation destination is performed in parallel to execution of the user program 210. Consequently, the consignment part 256 can execute the non-periodic-execution function module 55A out of synchronization with an execution cycle of the user program 210.

H2. Synchronous Execution

Figure 19:
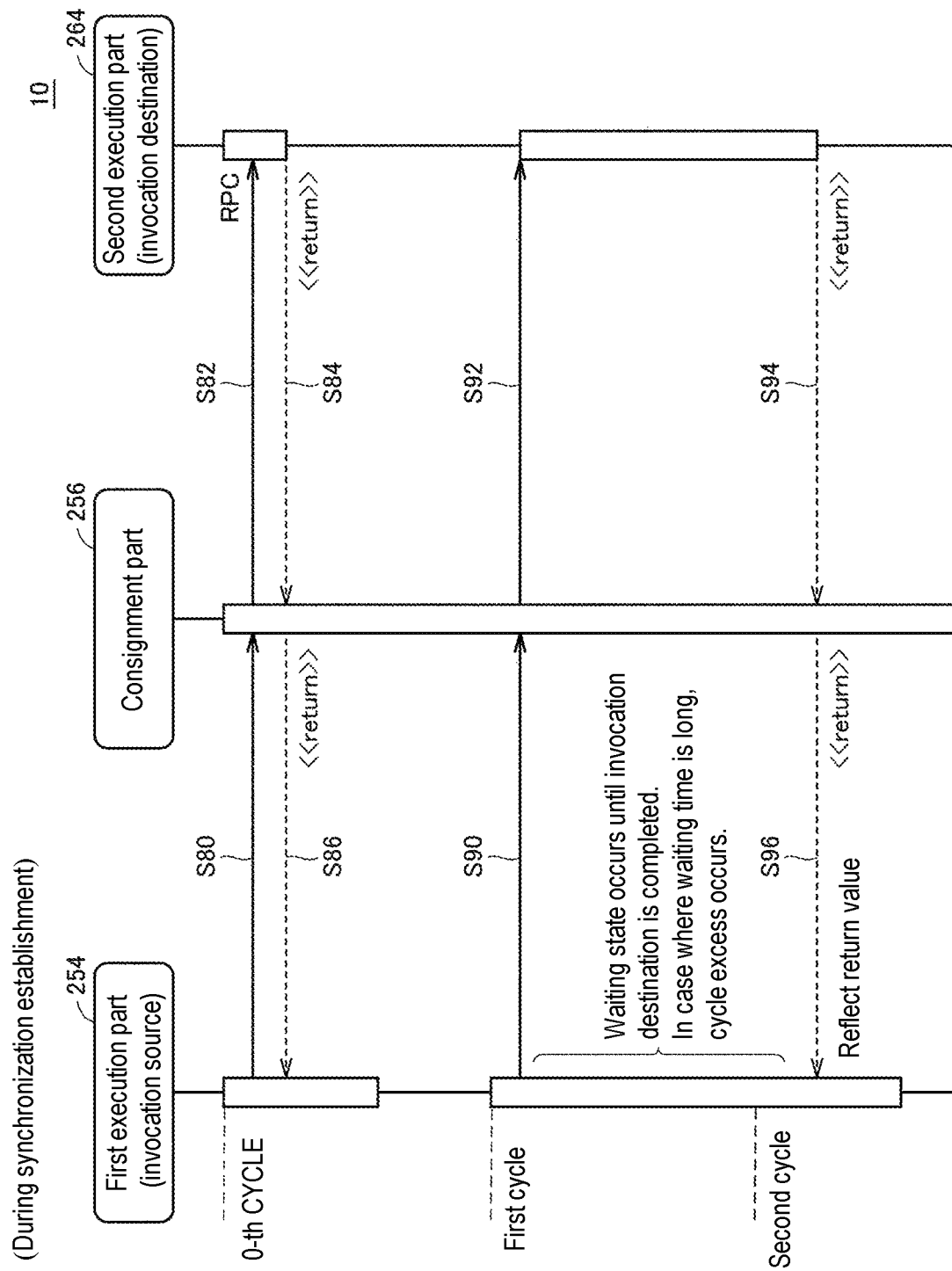
FIG. 19 is a diagram illustrating an example of a data flow in the control system in a case where the function module that is an invocation destination is synchronously executed.

FIG. 19 is a diagram illustrating an example of a data flow in the control system 10 in a case where the function module 55A that is an invocation destination is synchronously executed. Hereinafter, the description will be made on the basis of the function module 55A being invoked from the function module 55B that is a wrapper module.

The first execution part 254 repeatedly executes the user program 210 according to a control cycle of the controller 200. In a case of synchronous execution, execution of the user program 210 is stopped until execution of the function module 55A that is an invocation destination is completed.

More specifically, in step S80 (a 0-th control cycle of the controller 200), it is assumed that the first execution part 254 invokes the function module 55A that is an invocation destination from the function module 55B that is an invocation source.

In step S82, the consignment part 256 reflects the value of the input variable for the function module 55B that is an invocation source in the argument for the function module 55A that is an invocation destination on the basis of reception of an execution command for the function module 55A from the first execution part 254, and outputs an execution start command for the function module 55A to the second execution part 264. A method of reflecting the input variable in the argument is the same as described in FIG. 17, and thus a description thereof will not be repeated.

In step S84, execution of the function module 55A that is an invocation destination is assumed to be completed. On the basis of this fact, the second execution part 264 outputs an execution result of the function module 55A to the consignment part 256.

In step S86, the consignment part 256 reflects the execution result (return value) of the function module 55A in the output variable "ret" for the function module 55B. A method of reflecting the return value in the output variable is the same as described in FIG. 17, and thus a description thereof will not be repeated.

In step S90 (a first control cycle of the controller 200), it is assumed that the first execution part 254 invokes the function module 55A that is an invocation destination from the function module 55B that is an invocation source again.

In step S92, the consignment part 256 reflects the value of the input variable for the function module 55B that is an invocation source in the argument for the function module 55A that is an invocation destination on the basis of reception of an invocation command for the function module 55A from the first execution part 254, and outputs an execution start command for the function module 55A to the second execution part 264.

In step S94, execution of the function module 55A that is an invocation destination is assumed to be completed. On the basis of this fact, the second execution part 264 outputs an execution result of the function module 55A to the consignment part 256.

In step S96, the consignment part 256 reflects the execution result (return value) of the function module 55A in the output variable "ret" for the function module 55B.

As described above, during synchronous execution, the consignment part 256 stops execution of the user program 210 until the execution result of the function module 55A is received in step S94 after the execution start command for the function module 55A is output to the second execution part 264 in step S92. In other words, the consignment part 256 executes the function module 55A in series to execution of the user program 210. Consequently, the consignment part 256 can execute the non-periodic-execution function module 55A in synchronization with an execution cycle of the user program 210.

I. Appendix

As described above, the present embodiment includes the following disclosure.

Configuration 1

A control system including:
a storage device (208) that stores a control program (210, 211) for a controller, the control program (210, 211) including a periodic-execution function module (55B) for invoking a non-periodic-execution function module (55A);
a first control part (C1) that executes the control program (210, 211); and
a second control part (C2) that executes the non-periodic-execution function module (55A),
in which, in a case where the periodic-execution function module (55B) is executed during execution of the control program (210, 211), the first control part (C1) reflects a value of an input variable for the periodic-execution function module (55B) in an argument for the non-periodic-execution function module (55A) and outputs an execution start command for the non-periodic-execution function module (55A) to the second control part (C2),
in which the second control part (C2) starts execution of the non-periodic-execution function module (55A) on the basis of reception of the execution start command, and outputs a return value for the non-periodic-execution function module (55A) to the first control part (C1) on the basis of completion of the execution of the non-periodic-execution function module (55A), and
in which the first control part (C1) reflects the return value in an output variable for the periodic-execution function module (55B) on the basis of reception of the return value from the second control part (C2).

Configuration 2

The control system according to Configuration 1, in which the first control part (C1) stops the execution of the control program (210, 211) from outputting of the execution start command to the second control part (C2) until reception of the return value.

Configuration 3

The control system according to Configuration 1, in which the first control part (C1) continuously executes the control program (210, 211) from outputting of the execution start command to the second control part (C2) until reception of the return value.

Configuration 4

The control system according to Configuration 3, in which an output of the periodic-execution function module (55B) includes an output variable for reflecting the completion of the execution of the non-periodic-execution function module (55A).

Configuration 5

The control system according to any one of Configurations 1 to 4, in which the first control part (C1) converts the value of the input variable in accordance with a data type of the argument, and then reflects the value of the input variable in the argument.

Configuration 6

The control system according to any one of Configurations 1 to 5, in which the first control part (C1) converts the return value in accordance with a data type of the output variable, and then reflects the return value in the output variable.

Configuration 7

A control method for a control system including a first control part (C1) and a second control part (C2), the control method including:
  a step of acquiring a control program (210, 211) for a controller, the control program (210, 211) including a periodic-execution function module (55B) for invoking a non-periodic-execution function module (55A);
  a step (S1) of causing the first control part (C1) to execute the control program (210, 211);
  a step (S2) of, in a case where the periodic-execution function module (55B) is executed during execution of the control program (210, 211), causing the first control part (C1) to reflect a value of an input variable for the periodic-execution function module (55B) in an argument for the non-periodic-execution function module (55A) and to output an execution start command for the non-periodic-execution function module (55A) to the second control part (C2);
  a step (S3) of causing the second control part (C2) to start execution of the non-periodic-execution function module (55A) on the basis of reception of the execution start command, and to output a return value for the non-periodic-execution function module (55A) to the first control part (C1) on the basis of completion of the execution of the non-periodic-execution function module (55A); and
  a step (S4) of causing the first control part (C1) to reflect the return value in an output variable for the periodic-execution function module (55B) on the basis of reception of the return value from the second control part (C2).

Configuration 8

A periodic-execution control program (210, 211) executed by a controller, the control program (210, 211) including a periodic-execution function module (55B) for invoking a non-periodic-execution function module (55A), the controller including a first control part (C1), and an external apparatus configured to be able to communicate with the controller or the controller including a second control part (C2), the control program (210, 211) causing the first control part (C1) to execute:
  a step (S1) of executing the control program (210, 211);
  a step (S2) of, in a case where the periodic-execution function module (55B) is executed during execution of the control program (210, 211), reflecting a value of an input variable for the function module in an argument for the non-periodic-execution function module (55A) and outputting an execution start command for the non-periodic-execution function module (55A) to the second control part (C2); and
  a step (S4) of, on the basis of reception of an execution result of the non-periodic-execution function module (55A) from the second control part (C2), reflecting the execution result in an output variable for the periodic-execution function module (55B).

It should be considered that the embodiment disclosed this time is only an example in all respects and is not restrictive. The scope of the present invention is shown by the claims rather than the above description, and it is intended that all modifications within the meaning and scope equivalent to the claims are included.

The invention claimed is:
1. A control system, comprising:
  a storage device that stores a control program for a controller, the control program including a periodic-execution function module for invoking a non-periodic-execution function module;
  a first control part that executes the control program; and
  a second control part that executes the non-periodic-execution function module,
  wherein, in a case where the periodic-execution function module is executed during execution of the control program, the first control part reflects a value of an input variable for the periodic-execution function module in an argument for the non-periodic-execution function module and outputs an execution start command for the non-periodic-execution function module to the second control part,
  wherein the second control part starts execution of the non-periodic-execution function module based on reception of the execution start command, and outputs a return value for the non-periodic-execution function module to the first control part based on completion of the execution of the non-periodic-execution function module, and
  wherein the first control part reflects the return value in an output variable for the periodic-execution function module based on reception of the return value from the second control part.

2. The control system according to claim 1, wherein the first control part stops the execution of the control program from outputting of the execution start command to the second control part until the reception of the return value.

3. The control system according to claim 1, wherein the first control part continuously executes the control program from outputting of the execution start command to the second control part until the reception of the return value.

4. The control system according to claim 3, wherein an output of the periodic-execution function module includes an output variable for reflecting the completion of the execution of the non-periodic-execution function module.

5. The control system according to claim 1, wherein the first control part converts the value of the input variable in accordance with a data type of the argument, and then reflects the value of the input variable in the argument.

6. The control system according to claim 1, wherein the first control part converts the return value in accordance with a data type of the output variable, and then reflects the return value in the output variable.

7. A control method for a control system including a first control part and a second control part, the control method comprising:
  a step of acquiring a control program for a controller, the control program including a periodic-execution function module for invoking a non-periodic-execution function module;
  a step of causing the first control part to execute the control program;
  a step of, in a case where the periodic-execution function module is executed during execution of the control program, causing the first control part to reflect a value of an input variable for the periodic-execution function module in an argument for the non-periodic-execution function module and to output an execution start command for the non-periodic-execution function module to the second control part;
  a step of causing the second control part to start execution of the non-periodic-execution function module based on reception of the execution start command, and to output a return value for the non-periodic-execution function module to the first control part based on completion of the execution of the non-periodic-execution function module; and a step of causing the first control part to reflect the return value in an output variable for the periodic-execution function module based on reception of the return value from the second control part.

8. A non-transitory computer readable medium, storing a control program, which is a periodic-execution control program executed by a controller, the control program including a periodic-execution function module for invoking a non-periodic-execution function module, the controller including a first control part, and an external apparatus configured to be able to communicate with the controller or the controller including a second control part, the control program causing the first control part to execute:

a step of executing the control program;

a step of, in a case where the periodic-execution function module is executed during execution of the control program, reflecting a value of an input variable for the function module in an argument for the non-periodic-execution function module and outputting an execution start command for the non-periodic-execution function module to the second control part; and a step of, based on reception of an execution result of the non-periodic-execution function module from the second control part, reflecting the execution result in an output variable for the periodic-execution function module.

* * * * *